(12) United States Patent
Chester et al.

(10) Patent No.: US 8,428,103 B2
(45) Date of Patent: *Apr. 23, 2013

(54) DISCRETE TIME CHAOS DITHERING

(75) Inventors: David B. Chester, Palm Bay, FL (US);
Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 734 days.

This patent is subject to a terminal disclaimer.

(21) Appl. No.: 12/481,704

(22) Filed: Jun. 10, 2009

(65) Prior Publication Data

US 2010/0316090 A1    Dec. 16, 2010

(51) Int. Cl.
*H04B 1/00* (2006.01)
(52) U.S. Cl.
USPC .......................................... 375/141; 375/140
(58) Field of Classification Search .................. 375/141
See application file for complete search history.

(56) References Cited

U.S. PATENT DOCUMENTS

| | | | |
|---|---|---|---|
| 3,564,223 A | 2/1971 | Harris et al. | |
| 4,095,778 A | 6/1978 | Wing | |
| 4,646,326 A | 2/1987 | Backof, Jr. et al. | |
| 4,703,507 A | 10/1987 | Holden | |
| 4,893,316 A * | 1/1990 | Janc et al. | 708/300 |
| 5,007,087 A | 4/1991 | Bernstein et al. | |
| 5,048,086 A | 9/1991 | Bianco et al. | |
| 5,077,793 A | 12/1991 | Falk et al. | |
| 5,210,770 A | 5/1993 | Rice | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Aparicio; "Communications Systems Based on Chaos" May 2007. Universidad Rey Juan Carlos.

(Continued)

*Primary Examiner* — Erin File
(74) *Attorney, Agent, or Firm* — Fox Rothschild, LLP; Robert J. Sacco

(57) ABSTRACT

The invention concerns a chaotic communications system, method and apparatus having a transmitter configured to spread an input data signal over a wide intermediate frequency band, by digitally generating a first chaotic sequence of values to form a spreading code. The spreading code is then used to form a digital IF chaotic spread spectrum signal having a uniform sampling interval. The duration of the sampling interval is then selectively varied in accordance with a first pseudo-random sequence, thereby introducing a known dither in the digital IF chaotic spread spectrum signal. After introducing the known dither, the digital IF chaotic spread spectrum signal is converted to an analog RF spread spectrum signal at a conversion rate that exceeds the sampling interval of the chaotic spread spectrum signal. A corresponding receiver recovers the input data from the spread transmitted signal. This spreading may utilize a chaotic sequence employing discrete time chaos dithering.

19 Claims, 10 Drawing Sheets

U.S. PATENT DOCUMENTS

| | | | |
|---|---|---|---|
| 5,596,600 | A | 1/1997 | Dimos et al. |
| 5,598,476 | A | 1/1997 | LaBarre et al. |
| 5,646,997 | A | 7/1997 | Barton |
| 5,677,927 | A | 10/1997 | Fullerton et al. |
| 5,680,462 | A | 10/1997 | Miller et al. |
| 5,757,923 | A | 5/1998 | Koopman, Jr. |
| 5,811,998 | A | 9/1998 | Lundberg et al. |
| 5,852,630 | A | 12/1998 | Langberg et al. |
| 5,900,835 | A | 5/1999 | Stein |
| 5,923,760 | A | 7/1999 | Abarbanel et al. |
| 5,924,980 | A | 7/1999 | Coetzee |
| 5,937,000 | A | 8/1999 | Lee et al. |
| 5,963,584 | A | 10/1999 | Boulanger et al. |
| 6,014,446 | A | 1/2000 | Finkelstein |
| 6,023,612 | A | 2/2000 | Harris et al. |
| 6,038,317 | A | 3/2000 | Magliveras et al. |
| 6,078,611 | A | 6/2000 | La Rosa et al. |
| 6,141,786 | A | 10/2000 | Cox et al. |
| 6,212,239 | B1 | 4/2001 | Hayes |
| 6,304,216 | B1 | 10/2001 | Gronemeyer |
| 6,304,556 | B1 | 10/2001 | Haas |
| 6,310,906 | B1 | 10/2001 | Abarbanel et al. |
| 6,314,187 | B1 | 11/2001 | Menkhoff et al. |
| 6,331,974 | B1 | 12/2001 | Yang et al. |
| 6,377,782 | B1 | 4/2002 | Bishop et al. |
| 6,473,448 | B1 | 10/2002 | Shono et al. |
| 6,570,909 | B1 | 5/2003 | Kansakoski et al. |
| 6,614,914 | B1 | 9/2003 | Rhoads et al. |
| 6,665,692 | B1 | 12/2003 | Nieminen |
| 6,732,127 | B2 | 5/2004 | Karp |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,842,745 | B2 | 1/2005 | Occhipinti et al. |
| 6,864,827 | B1 * | 3/2005 | Tise et al. ............... 342/25 A |
| 6,865,218 | B1 | 3/2005 | Sourour |
| 6,888,813 | B1 | 5/2005 | Kishi |
| 6,901,104 | B1 | 5/2005 | Du et al. |
| 6,937,568 | B1 | 8/2005 | Nicholl et al. |
| 6,980,656 | B1 | 12/2005 | Hinton, Sr. et al. |
| 6,980,657 | B1 | 12/2005 | Hinton, Sr. et al. |
| 6,986,054 | B2 | 1/2006 | Kaminaga et al. |
| 6,993,016 | B1 | 1/2006 | Liva et al. |
| 6,999,445 | B1 | 2/2006 | Dmitriev et al. |
| 7,023,323 | B1 | 4/2006 | Nysen |
| 7,027,598 | B1 | 4/2006 | Stojancic et al. |
| 7,035,220 | B1 | 4/2006 | Simcoe |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,286,802 | B2 | 10/2007 | Beyme et al. |
| 7,310,309 | B1 | 12/2007 | Xu |
| 7,349,381 | B1 | 3/2008 | Clark et al. |
| 7,423,972 | B2 | 9/2008 | Shaham et al. |
| 7,529,292 | B2 | 5/2009 | Bultan et al. |
| 7,643,537 | B1 | 1/2010 | Giallorenzi et al. |
| 7,725,114 | B2 | 5/2010 | Feher |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 7,929,498 | B2 | 4/2011 | Ozluturk et al. |
| 7,949,032 | B1 | 5/2011 | Frost |
| 7,974,146 | B2 | 7/2011 | Barkley |
| 8,068,571 | B2 * | 11/2011 | Chester et al. ............... 375/353 |
| 2001/0017883 | A1 | 8/2001 | Tiirola et al. |
| 2002/0012403 | A1 | 1/2002 | McGowan et al. |
| 2002/0034191 | A1 * | 3/2002 | Shattil ............... 370/464 |
| 2002/0034215 | A1 | 3/2002 | Inoue et al. |
| 2002/0041623 | A1 | 4/2002 | Umeno |
| 2002/0054682 | A1 | 5/2002 | Di Bernardo et al. |
| 2002/0099746 | A1 | 7/2002 | Tie et al. |
| 2002/0110182 | A1 | 8/2002 | Kawai |
| 2002/0115461 | A1 | 8/2002 | Shiraki et al. |
| 2002/0122465 | A1 | 9/2002 | Agee et al. |
| 2002/0128007 | A1 | 9/2002 | Miyatani |
| 2002/0172291 | A1 | 11/2002 | Maggio et al. |
| 2002/0174152 | A1 | 11/2002 | Terasawa et al. |
| 2002/0176511 | A1 | 11/2002 | Fullerton et al. |
| 2002/0186750 | A1 | 12/2002 | Callaway et al. |
| 2003/0007639 | A1 | 1/2003 | Lambert |
| 2003/0016691 | A1 | 1/2003 | Cho |
| 2003/0044004 | A1 | 3/2003 | Blakley et al. |
| 2003/0156603 | A1 | 8/2003 | Rakib et al. |
| 2003/0182246 | A1 | 9/2003 | Johnson et al. |
| 2003/0198184 | A1 | 10/2003 | Huang et al. |
| 2004/0001534 | A1 | 1/2004 | Yang |
| 2004/0001556 | A1 | 1/2004 | Harrison et al. |
| 2004/0059767 | A1 | 3/2004 | Liardet |
| 2004/0092291 | A1 | 5/2004 | Legnain et al. |
| 2004/0100588 | A1 | 5/2004 | Hartson et al. |
| 2004/0146095 | A1 | 7/2004 | Umeno et al. |
| 2004/0156427 | A1 | 8/2004 | Gilhousen et al. |
| 2004/0161022 | A1 | 8/2004 | Glazko et al. |
| 2004/0165650 | A1 | 8/2004 | Miyazaki et al. |
| 2004/0165681 | A1 | 8/2004 | Mohan |
| 2004/0184416 | A1 | 9/2004 | Woo |
| 2004/0196212 | A1 | 10/2004 | Shimizu |
| 2004/0196933 | A1 | 10/2004 | Shan et al. |
| 2005/0004748 | A1 * | 1/2005 | Pinto et al. ............... 701/200 |
| 2005/0021308 | A1 | 1/2005 | Tse et al. |
| 2005/0031120 | A1 | 2/2005 | Samid |
| 2005/0050121 | A1 | 3/2005 | Klein et al. |
| 2005/0075995 | A1 | 4/2005 | Stewart et al. |
| 2005/0089169 | A1 | 4/2005 | Kim et al. |
| 2005/0129096 | A1 | 6/2005 | Zhengdi et al. |
| 2005/0207574 | A1 | 9/2005 | Pitz et al. |
| 2005/0249271 | A1 | 11/2005 | Lau et al. |
| 2005/0254587 | A1 | 11/2005 | Kim et al. |
| 2005/0259723 | A1 | 11/2005 | Blanchard |
| 2005/0265430 | A1 | 12/2005 | Ozluturk et al. |
| 2005/0274807 | A1 | 12/2005 | Barrus et al. |
| 2006/0034378 | A1 | 2/2006 | Lindskog et al. |
| 2006/0072754 | A1 | 4/2006 | Hinton et al. |
| 2006/0088081 | A1 | 4/2006 | Withington et al. |
| 2006/0093136 | A1 | 5/2006 | Zhang et al. |
| 2006/0123325 | A1 | 6/2006 | Wilson et al. |
| 2006/0209926 | A1 | 9/2006 | Umeno et al. |
| 2006/0209932 | A1 | 9/2006 | Khandekar et al. |
| 2006/0239334 | A1 | 10/2006 | Kwon et al. |
| 2006/0251250 | A1 | 11/2006 | Ruggiero et al. |
| 2006/0264183 | A1 | 11/2006 | Chen et al. |
| 2007/0098054 | A1 | 5/2007 | Umeno |
| 2007/0121945 | A1 | 5/2007 | Han et al. |
| 2007/0133495 | A1 | 6/2007 | Lee et al. |
| 2007/0149232 | A1 | 6/2007 | Koslar |
| 2007/0195860 | A1 | 8/2007 | Yang et al. |
| 2007/0201535 | A1 | 8/2007 | Ahmed |
| 2007/0217528 | A1 | 9/2007 | Miyoshi et al. |
| 2007/0230701 | A1 | 10/2007 | Park et al. |
| 2007/0253464 | A1 | 11/2007 | Hori et al. |
| 2007/0291833 | A1 | 12/2007 | Shimanskiy |
| 2008/0008320 | A1 | 1/2008 | Hinton et al. |
| 2008/0016431 | A1 | 1/2008 | Lablans |
| 2008/0019422 | A1 | 1/2008 | Smith et al. |
| 2008/0026706 | A1 | 1/2008 | Shimizu et al. |
| 2008/0075195 | A1 | 3/2008 | Pajukoski et al. |
| 2008/0080439 | A1 | 4/2008 | Aziz et al. |
| 2008/0084919 | A1 | 4/2008 | Kleveland et al. |
| 2008/0095215 | A1 | 4/2008 | McDermott et al. |
| 2008/0107268 | A1 | 5/2008 | Rohde et al. |
| 2008/0198832 | A1 | 8/2008 | Chester |
| 2008/0204306 | A1 | 8/2008 | Shirakawa |
| 2008/0263119 | A1 | 10/2008 | Chester et al. |

| | | | |
|---|---|---|---|
| 2008/0294707 A1 | 11/2008 | Suzuki et al. | |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |
| 2008/0307022 A1 | 12/2008 | Michaels et al. | |
| 2008/0307024 A1 | 12/2008 | Michaels et al. | |
| 2009/0022212 A1 | 1/2009 | Ito et al. | |
| 2009/0034727 A1 | 2/2009 | Chester et al. | |
| 2009/0044080 A1 | 2/2009 | Michaels et al. | |
| 2009/0059882 A1 | 3/2009 | Hwang et al. | |
| 2009/0086848 A1 | 4/2009 | Han et al. | |
| 2009/0110197 A1 | 4/2009 | Michaels | |
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |
| 2009/0245327 A1* | 10/2009 | Michaels | 375/130 |
| 2009/0279688 A1 | 11/2009 | Michaels et al. | |
| 2009/0279690 A1 | 11/2009 | Michaels et al. | |
| 2009/0285395 A1 | 11/2009 | Hu et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0029225 A1 | 2/2010 | Urushihara et al. | |
| 2010/0030832 A1 | 2/2010 | Mellott | |
| 2010/0054225 A1 | 3/2010 | Hadef et al. | |
| 2010/0073210 A1 | 3/2010 | Bardsley et al. | |
| 2010/0091700 A1* | 4/2010 | Michaels | 370/328 |
| 2010/0111296 A1 | 5/2010 | Brown et al. | |
| 2010/0142593 A1 | 6/2010 | Schmid | |
| 2010/0254430 A1 | 10/2010 | Lee et al. | |
| 2010/0260276 A1 | 10/2010 | Orlik et al. | |
| 2010/0309957 A1* | 12/2010 | Chester et al. | 375/146 |
| 2011/0222393 A1 | 9/2011 | Kwak et al. | |

FOREIGN PATENT DOCUMENTS

| | | |
|---|---|---|
| EP | 2 000 900 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Bererber, S.M., et al., "Design of a CDMA System in FPGA Technology", Vehicular Technology Conference, 2007. VTC2007-Spring. IEEE 65$^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. \_1-1\_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/069121.

Harris Corp., International Search Report mailed Apr. 13, 2010, Application Serial No. PCT/US2009/069118.

Harris Corp., European Search Report mailed Mar. 4, 2010, Patent Application No. 08009745.4.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Kolumban, et al., "Chaotic Communications with Correlator Receivers: Theory and Performance Limits" Proceedings of the IEEE, vol. 90, No. 5, May 2002.

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009 ] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".
Michaels, et al., U.S. Appl. No. 12/496,233, filed Jul. 1, 2009, entitled "Permission-Based Secure Multiple Access Communication Systems Rotations".
Michaels, et al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jul. 1, 2009, entitled "Bit Error Rate Reduction in Chaotic Communications".
Michaels, Alan, U.S. Appl. No. 12/248,131, filed Oct. 9, 2008, entitled "Ad-Hoc Network Acquisition Using Chaotic Sequence Spread Waveform".
Michaels, Alan, U.S. Appl. No. 12/201,021, filed Aug. 29, 2008, entitled, "Multi-Tier Ad-Hoc Network Communications".
Taylor, F.J., "Residue Arithmetic a Tutorial with Examples", Computer, vol. 17, No. 5, pp. 50-62, May 1984, doi: 10.1109/MC. 1984.1659138.
Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Information about Related Patents and Patent Applications, see section 6 of the accompanying Information Disclosure Statement Letter, which concerns Related Patents and Patents Applications.
Menezes, Vanstone, Oorschot: "Handbook of Applied Cryptography", 1997, CRC Press LLC, USA, XP002636791, p. 80-p. 85, p. 238-242.
Schneier, Bruce: "Applied Cryptography Second Edition", 1997, John Wiley & Sons, USA, XP002636792, p. 254-p. 255.
Socek, D., et al., Short Paper: Enhanced 1-D Chaotic Key Based Algorithm for Image Encryption, Sep. 2005, IEEE.
Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.
Pirkin, Llya, Calculations in Galois Fields., C/C++ Users Journal; Oct. 2004, vol. 22 Issue 10, p. 14-18, 4p, 1 Color Photograph.
Popescu, Angel, A Galois Theory for the Field Extension K ((X))/K., Glasgow Mathematical Journal; Sep. 2010, vol. 52 Issue 3, p. 447-451, 5p.
Pirkin, Ilya, Calculations in Galois Fields., C/C++ Users Journal; Oct. 2004, vol. 22 Issue 10, p. 14-18, 4p, 1 Color Photograph.
Diaz-Toca, G.M. and Lombardi, H. , Dynamic Galois Theory., Journal of Symbolic Computation; Dec. 2010, vol. 45 Issue 12, p. 1316-1329, 14p.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.

Office Action issued in Japanese Patent Application No. 2010-504206 in the name of Harris Corporation; mailed Jan. 6, 2012.
Bender, et al., "Techniques for data hiding", 1995, IBM Systems Journal, vol. 35, pp. 313-336.
Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.
Barile, Margherita, "Bijective," From MathWorld—A Wolfram Web Resource, created by Eric W. Weisstein. http://mathworld.wolfram.com/Bijective.html.
Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Morsche, et al., "Signals and Systems," lecture notes, University of Eindhoven, The Netherlands, 1999.
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.
Vanwiggeren, et al., "Chaotic Communication Using Time-Delayed Optical Systems," International Journal of Bifurcation and Chaos, vol. 9, No. 11, (1999) pp. 2129-2156, World Scientific Publishing Co.
Weisstein, Eric W., "Injection," From MathWorld—A Wolfram Web Resource. http://mathworld.wolfram.com/Injection.html.
Weisstein, Eric W. "Surjection," From MathWorld—A Wolfram Web Resource, http://mathworld.wolfram.com/Surjection.html.
Yen, et al., (1999) "Residual Number System Assisted CDMA: A New System Concept", In: Acts'99, Jun. 8-11, 1999, Sorrento, Italy.
Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

* cited by examiner

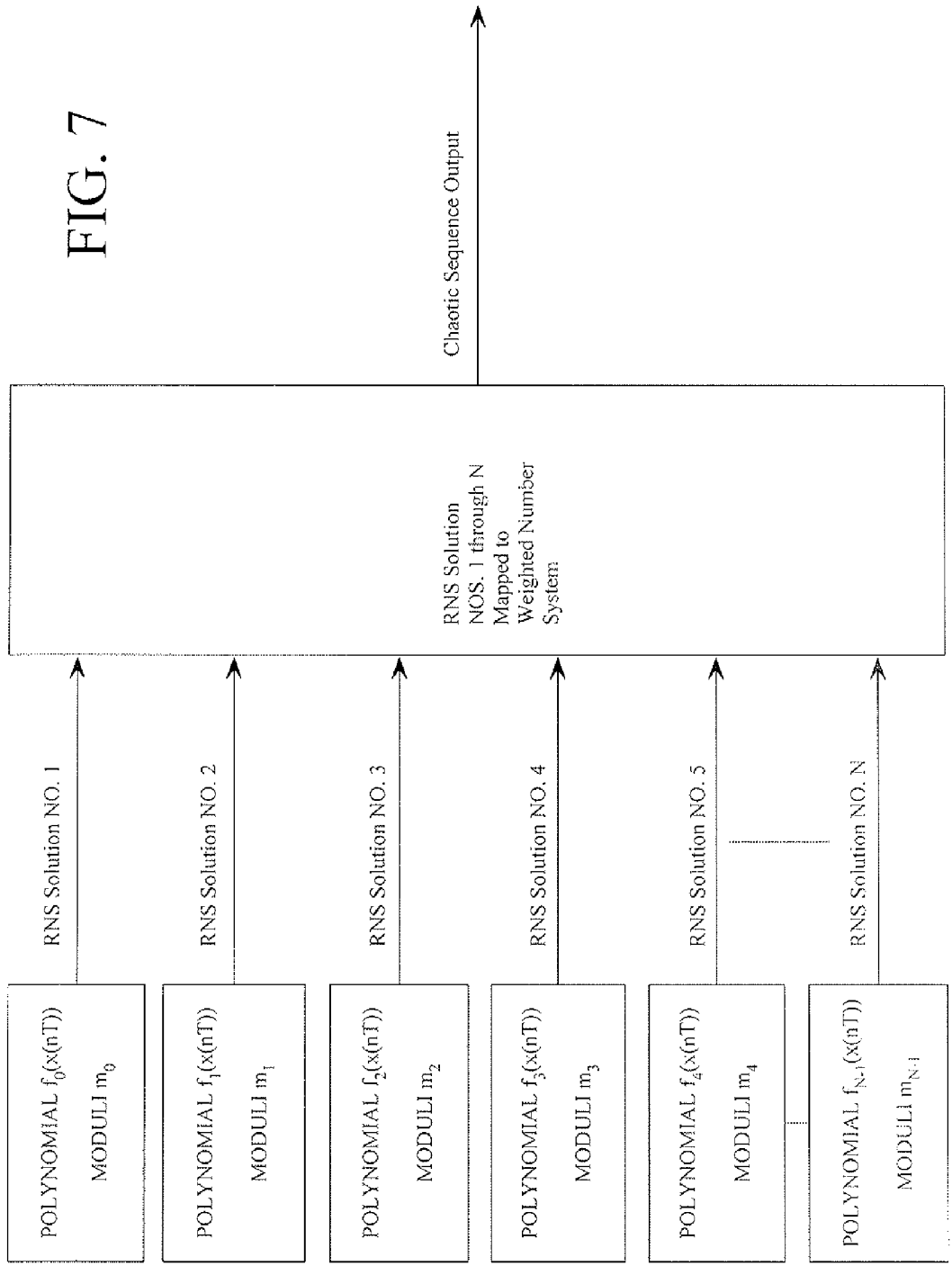

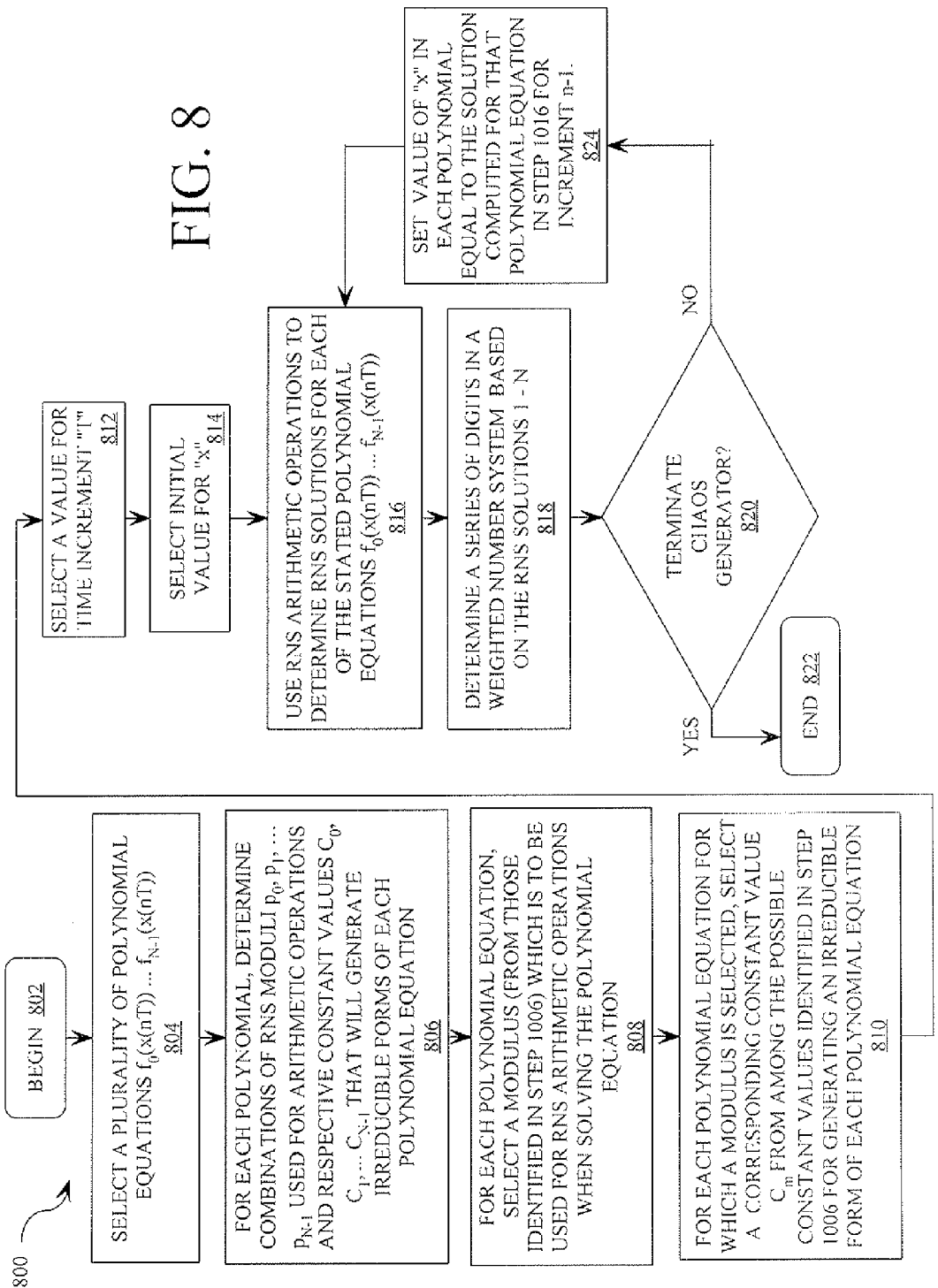

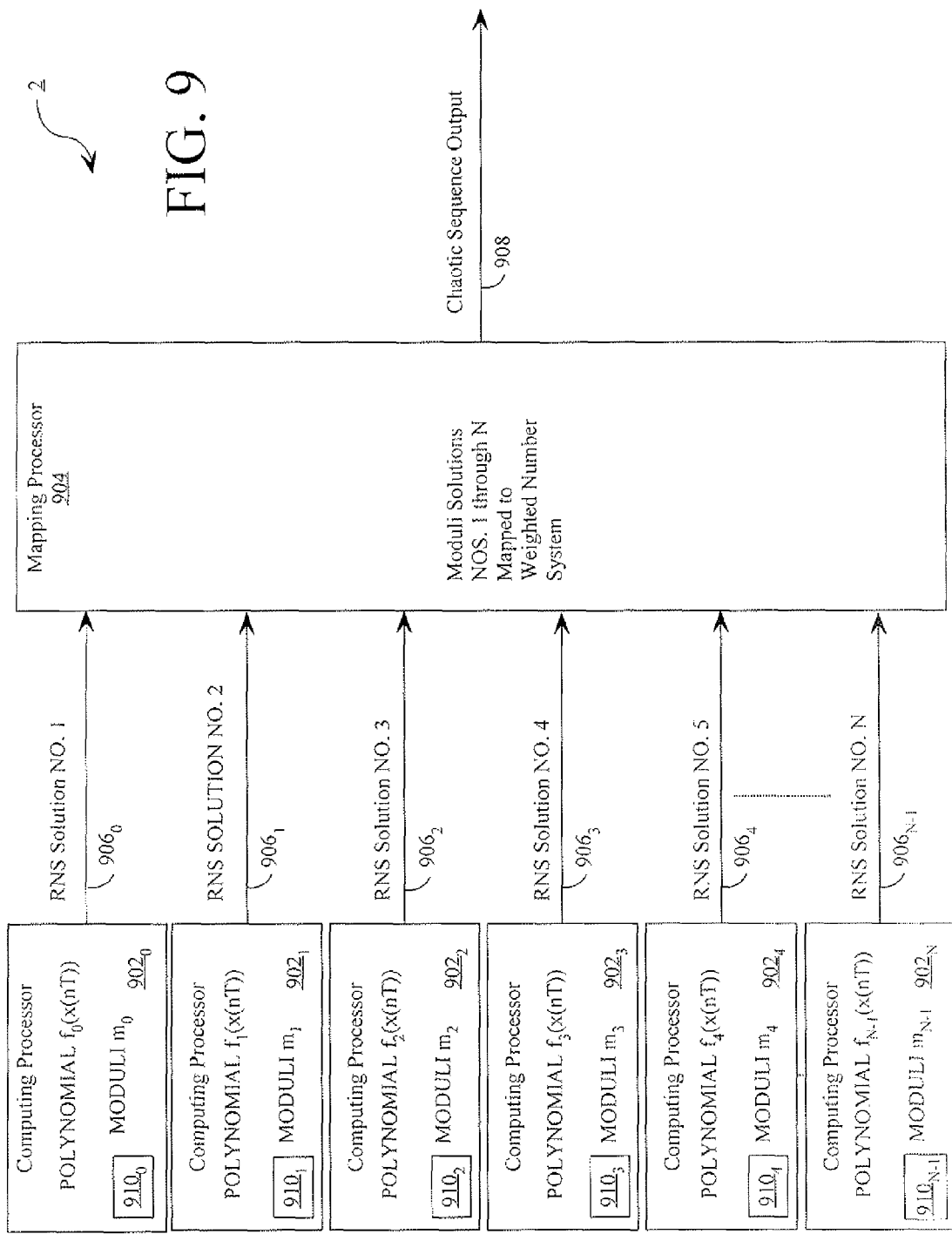

DISCRETE TIME CHAOS DITHERING

BACKGROUND OF THE INVENTION

1. Statement of the Technical Field

The invention concerns communications systems. More particularly, the invention concerns a communications system having a transmitter configured to spread an input data signal over a wide intermediate frequency band, with a corresponding receiver to recover the input data from the spread transmitted signal.

2. Description of the Related Art

Covert radio communication is desirable in some circumstances. Communications systems may be designed to have a low probability of detection ("LPD"), wherein the probability is made smaller that an unintended receiver can detect the presence of a communication signal. Communications systems also may be designed to have a low probability of interception ("LPI"), wherein the probability is made smaller that an unintended receiver can receive and decode the communications signal. Information can not be transmitted without transmitting energy over a channel. However, the LPI/LPD characteristics of communications can be enhanced by reducing the cyclostationarity and correspondingly spectral energy density of the communications signal.

It is well known in the art that LPI/LPD characteristics are enhanced by the introduction of a pseudo-noise ("PN") chip sequence onto the transmitted waveform. The PN sequence is a deterministic sequence of +1 or −1, having a long period until it repeats, with the characteristic that sections of the PN sequence less than the whole sequence have the appearance of a random sequence of +1 or −1. The PN sequence operates to modulate the transmitted waveform at a rate that is higher than the information symbol rate of the transmitted waveform. The effect upon the transmitted spectrum is to convolve the spectrum of the PN signal with the spectrum of the modulated waveform prior to the PN sequence. Because the PN sequence is at a fast rate relative the modulation symbol rate, the spectrum of the PN-modulated signal is greatly spread, thus reducing the peak spectral energy and power spectral density per unit bandwidth.

Pseudorandom number generators (PRNG) generally utilize digital logic or a digital computer and one or more algorithms to generate a sequence of numbers. While the output of conventional PRNG may approximate some of the properties of random numbers, they are not truly random. Since the algorithms used for generating pseudorandom sequences are deterministic, such sequences will always be periodic.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Communications systems utilizing chaotic sequences offer promise for being the basis of a next generation of LPI/LPD waveforms, and secure waveforms. The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

Information can not be transmitted without transmitting energy over a channel. Chaotic signals already have extremely robust LPI/LPD characteristics. The LPI/LPD characteristics can be improved further by increasing the perceived randomness of the transmitted signal, thereby reducing the peak spectral energy density. One way to reduce energy density is to increase the chaotic spreading ratio. However for a given symbol rate the spreading ratio can be limited by practical chaos generation rates.

SUMMARY OF THE INVENTION

The present invention is directed to method, apparatus and system for the transmission and reception of RF signals having improved suppression of the cyclostationarity and correspondingly spectral energy density of a transmitted signal, in particular the peak cyclostationarity and correspondingly spectral energy density.

Embodiments of the present invention relate to communication systems having a low probability of interception (LPI) and/or a low probability of detection (LPD). More specifically, embodiments of the present invention relate to a method, apparatus and system for the transmission and reception of RF signals having improved suppression of the cyclostationarity and correspondingly spectral energy density of a transmitted signal, by the introduction of a discrete time chaos dither into the sample times of a chaotic sequence-spread signal.

Preferably, embodiments of the present invention are practiced on a spread-spectrum communication system that utilizes chaotic sequences.

An additional layer of robustness and increased energy density suppression can be achieved by using a discrete time chaos dithering mechanism that is known by both the transmitter and intended receiver, to force the non uniform sampling of the chaotic spread waveform. The discrete time chaos digital dithering offers the stability of a digital implementation while requiring an extremely high rate clock and high rate clocks to control the discrete time chaos dithering.

Embodiments of the present invention provide a system and method for reducing energy density in a spread spectrum data communication channel, by digitally generating a first chaotic sequence of values to form a spreading code. The spreading code is then used to form a digital intermediate frequency (IF) spread spectrum signal having a uniform sampling interval. The duration of the sampling interval is then selectively varied in accordance with a pseudo-random sequence, thereby introducing a known dither in the digital IF spread spectrum signal.

Optionally, this system and method may further include receiving the RF spread spectrum signal at a receiver, converting the RF spread spectrum signal to a received digital IF spread spectrum signal, generating at the receiver a second pseudo-random sequence which is identical to the first pseudo-random sequence, and using the second pseudo-random sequence to remove the known dither in the received digital IF spread spectrum signal and thereby generate a uniform received digital IF spread spectrum signal having the uniform sampling interval. Variations of this embodiment may further include synchronizing the second pseudo-random sequence and the first pseudo-random sequence; or generating at the receiver a de-spreading code which is identical to, and synchronized with, said spreading code, then de-spreading the received digital IF spread spectrum signal using the de-spreading code.

Embodiments of the invention may also include an apparatus for reducing energy density in a chaotic spread spectrum data communication channel, including portions of the transmitting side of the system, such as a first digital chaos generator producing a first chaotic sequence of values to form a spreading code, a modulator using the spreading code to form a digital IF spread spectrum signal having a uniform sampling interval, a timing variation apparatus selectively varying a duration of the sampling interval in accordance with a first pseudo-random sequence to introduce a known dither in said digital IF spread spectrum signal, and a converter accepting the digital IF spread spectrum signal incorporating the known dither, and producing an analog RF spread spectrum signal The apparatus may further use a chaotic sequence as the first pseudo-random sequence.

Embodiments of the invention may also include portions of the receiving side of the system, such as a receiver receiving the RF spread spectrum signal, a converter converting the RF spread spectrum signal to a received digital IF spread spectrum signal, a generator at the receiver producing a second chaotic sequence which is identical to the first chaotic sequence, and a demodulator using the second pseudo-random sequence to remove the known dither in the received digital IF spread spectrum signal and thereby generate a uniform received digital IF spread spectrum signal having a uniform sampling interval.

BRIEF DESCRIPTION OF THE DRAWINGS

Embodiments will be described with reference to the following drawing figures, in which like numerals represent like items throughout the figures, and in which:

FIG. 7 is a conceptual diagram of the chaos generators of FIG. 2 and FIGS. 4-7.

FIG. 8 is a flow diagram of a method for generating a chaotic sequence.

FIG. 9 is a more detailed block diagram of the chaos generator of FIG. 2.

DETAILED DESCRIPTION OF THE INVENTION

Embodiments of the present invention are related to communications using signals designed to have LPI/LPD characteristics. In addition to spreading the transmitted signal using a chaotically-generated sequence, an additional layer of robustness and increased cyclostationary feature suppression is achieved by using an a priori known dithering mechanism to force the non uniform sampling of the chaotically-spread waveform. The spreading and dithering mechanism of the present invention can be practiced using chaotic sequences as described, or by using conventional PN sequences in place of the chaotic sequences.

Figure 1:
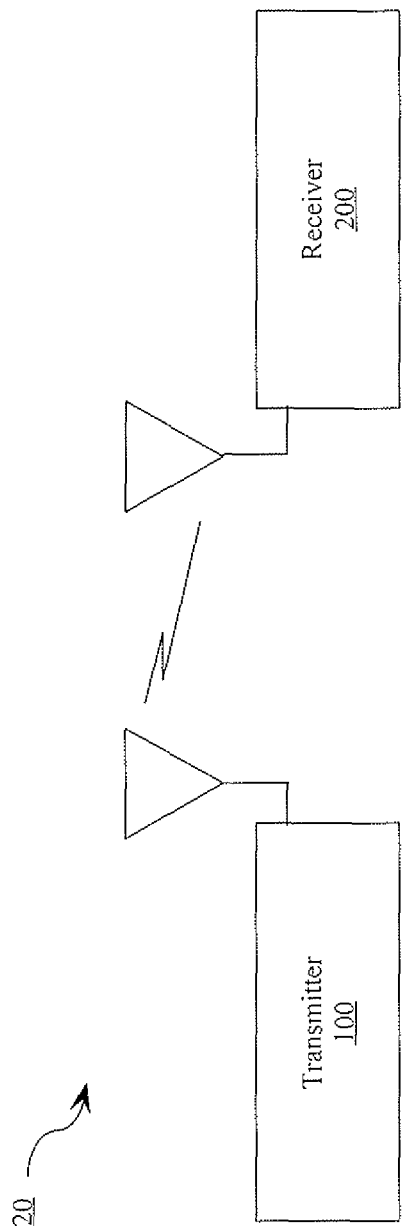
FIG. 1 is a block diagram of a coherent chaotic spread-spectrum communication system that is useful for understanding the present invention.

Referring now to FIG. 1, there is provided a block diagram of a coherent chaotic spread-spectrum communication system 20 that is useful for understanding the present invention. As shown in FIG. 1, communication system 20 includes a transmitter 100 and a receiver 200. Transmitter 100 is configured to accept an amplitude-and-time-discrete signal and to spread the amplitude-and-time-discrete signal over a wide frequency band. The amplitude-and-time-discrete baseband signal may have already been spread by multiplication by, for instance, a chaotic sequence or a pseudo-random number sequence. Transmitter 100 is further configured to communicate analog chaotic signals to receiver 200 via a communications link.

Receiver 200, in steady-state conditions, knows the chaotic sequence a-priori and has acquired the temporal location within the chaotic sequence (i.e., the receiver 200 is time-synchronized to the chaotic sequence). Receiver 200 is then able to remove the chaotic sequence and demodulate information symbols from the remaining waveform. In contrast, an unintended receiver (not shown) does not know the chaotic sequence and is unable to remove it. In effect, the unintended receiver (not shown) sees just a noise like signal having reduced peak spectral energy. The unintended receiver (not shown) is unable to remove the chaotic sequence or demodulate the information symbols.

According to an embodiment of the present invention, communications system 20 employs phase shift keying (PSK) symbols. However, the invention is not limited in this regard. Other types of phase shift keying symbols can be used without limitation.

Referring again to FIG. 1, transmitter 100 is configured to generate an output signal having chaotic properties, i.e., an output signal having its frequency spectrum varied over time. As such, communication system 20 has many advantages as compared to conventional spread-spectrum communications systems. Communication system 20 also has many advantages over chaos based spread spectrum systems utilizing analog based chaotic sequence generators. Communication system 20 corrects drift between a transmitter and a receiver without an extreme compromise of throughput.

Communication system 20 utilizes a coherent chaotic sequence spread spectrum (CCSSS) method. Prior to being transmitted, data symbols are combined with a higher rate chaotic sequence (analogous to the binary PN spreading sequence known as a chipping code in traditional direct sequence spread spectrum systems) that spreads the spectrum of the data according to a spreading ratio. In addition, a jitter having a sequence known a priori is added to the spreading sequence. The resulting signal resembles a truly random signal, but this randomness can be removed at the receiving end to recover the original data. In particular, the data is recovered by adjusting the recovery clock with the same jitter sequence used in the transmitter 100. Communication system 20 channel-encodes an IF carrier with information symbols, e.g., PSK symbols. The channel encoding is one of two operations commonly known as modulation. The other operation commonly known as modulation is mixing times a local oscillator or other sequence which results in frequency translation and also may be used herein.

Communication system 20 also modulates the phase modulated carrier at a rate in a chaotic manner utilizing a string of discrete time chaotic samples. The discrete time chaotic samples shall hereinafter be referred to as "chips". The rate at which the phase modulated carrier is modulated by the chips shall hereinafter be referred to as a "chip rate" or a "chaos chip rate." Each chip generally has a much shorter sample time interval than the duration of each of the information symbols. Thus, it will be understood that the carrier is modulated using the chaotic sequence chips. Moreover, it will be understood that the chip rate associated with the chaotic sequence is much higher than the symbol rate. It should also be understood that the chaotic sequence of chips which are utilized for generating the transmitted signal is known a priori by receiver 200. Consequently, the same chaotic sequence can be used at receiver 200 to reconstruct the non-spread carrier or remove the effect of spreading at receiver 200.

The cyclostationary characteristics of the transmitted signal, as seen by an unintended receiver (not shown), may be further suppressed by the intentional introduction of a dither known a priori into the transmitted signal. The dither may be based, for instance, on a discrete time chaos process. The dither may also be referred to herein as a jitter.

Figure 2:
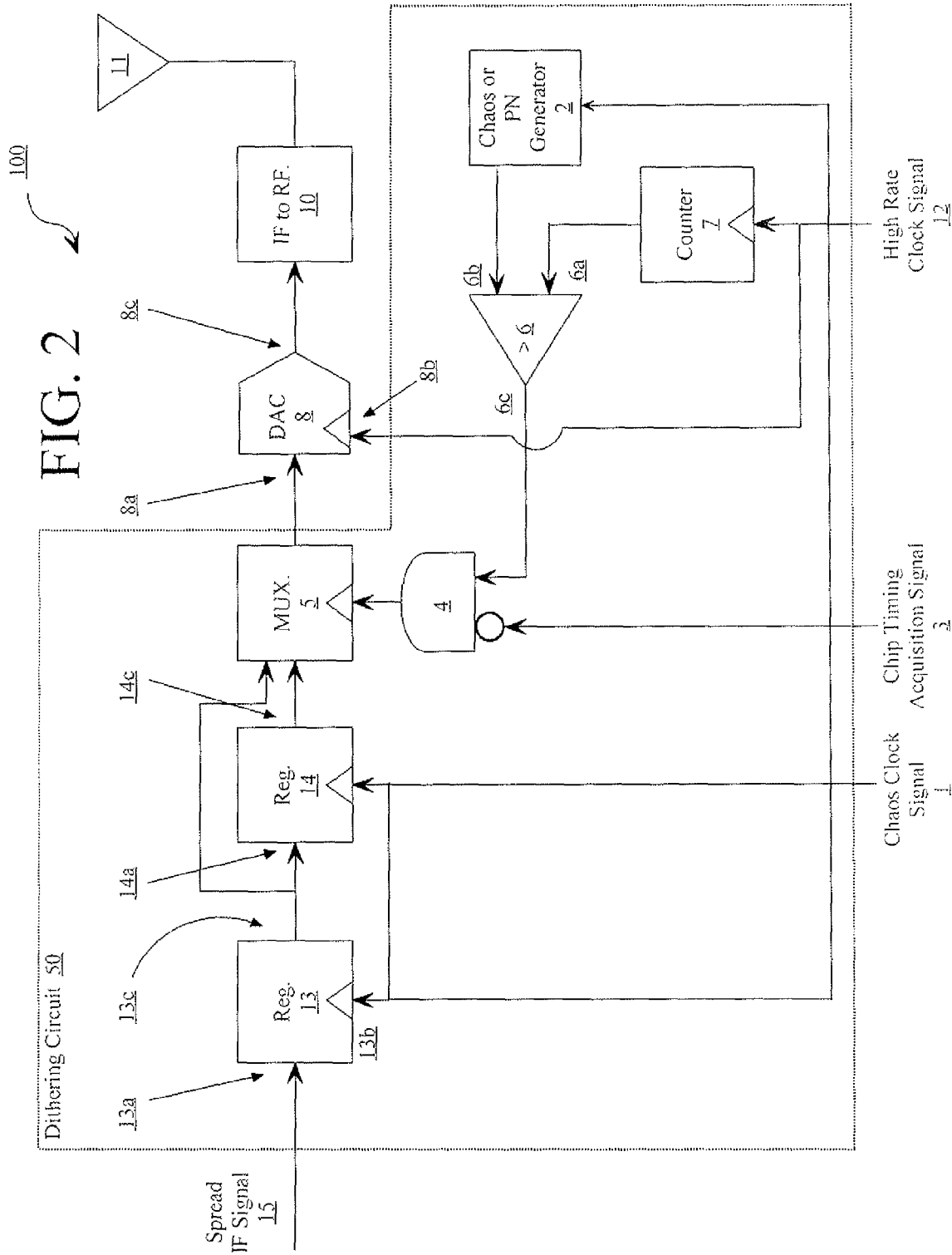
FIG. 2 is a block diagram of a transmitter comprising a dithering circuit according to an embodiment of the invention.

Referring now to FIG. 2, there is provided a block diagram of transmitter 100. Transmitter 100 has been selected to illustrate the introduction of discrete time chaos dither into the transmit side. In this regard, it should be understood that transmitter 100 comprises a dithering circuit 50, a digital to analog converter (DAC) 8, and an IF-to-RF converter 10 which includes an anti-image (a.k.a. smoothing) filter (not shown) with characteristics compatible with dither circuit 50. As shown in FIG. 2, dithering circuit 50 is comprised of delay registers 13, 14, a multiplexer (MUX) 5, a gate 4, a digital comparator 6, a chaos or pseudo-random number number (PN) generator 2, and a counter 7.

Dithering circuit 50 is configured to receive an input spread IF signal 15 from an external device (not shown). An IF signal has a sampling frequency which is much lower than the high rate clock 12 of the dither circuit. The spread IF signal 15 is a sequence of digital values of the IF signal (i.e., a digital IF spread spectrum signal) that has been channel encoded by information-bearing symbols (e.g., PSK symbols) at a symbol rate, and has been further modulated by a chaos chip sequence or PN sequence at a chaos chip rate, thereby spreading it over a wide intermediate frequency band. This spreading consists of multiplying the amplitude-and-time-discrete IF signal by a digital chaotic sequence or a digital PN sequence. The product of this arithmetic operation is the spread IF signal 15. The spread IF signal 15 is also referred to herein as a digital chaotic signal. The spread IF signal 15 is uniformly sampled (i.e., constant sampling interval). Dithering circuit 50 dithers the sample interval about the constant sample interval. Embodiments of the invention may assume that off-the-shelf data converters are utilized. Embodiments of the invention may further assume that the data converters are implemented using Clocked Boolean Logic (CBL). As such, the data converters are configured to receive stable and uniform interval clock signals for proper operation.

The output sample timing can be dithered as a positive or negative delay from the nominal clock edge. The latter is described below. FIG. 2 assumes that the spread IF signal 15 has been spread by a chaotic sequence or a PN sequence using an IF sample clock (not shown) that is operating at the chaos chip sample rate. Delay registers 13, 14 described below derive timing from the chaos sample clock (not shown).

Dithering circuit 50 is also configured to receive a chaos sample clock signal 1. The chaos sample clock signal 1 is generated by an external chaos sample clock (not shown). The chaos sample clock (not shown) operates at a rate (i.e., a chaos chip sample rate) that is the same as the IF sample clock rate, with a period referred herein as the chaos chip sample period which is an integer sub multiple of the nominal chip period. The chaos chip sample rate is greater than the information symbol rate. The chaos sample clock (not shown) may be phase offset from the IF sample clock in order to avoid points in time at which the digital spread IF signal 15 may be transitioning from one chip sample period to the next. The digital spread IF signal 15 is provided as a first input 13a to a first register 13. The chaos sample clock signal 1 is provided as a second input 13b to the first register 13. The function of the first register 13 is to hold constant, at an output 13c of the first register 13, the digital value of the spread IF signal at edges of the chaos sample clock (not shown).

Output 13c of the first register 13 is provided as an input 14a to a second register 14. The function of the second register 14 is similar to that of the first register 13. Together, the first register 13 and the second register 14 delay the spread IF signal 15 by a first predetermined interval at the output 13c, and delay the spread IF signal 15 by a second predetermined interval at output 14c of the second register 14.

Outputs 13c and 14c are provided as inputs to MUX 5. MUX 5 selects which register's output (13c or 14c) is to be routed to DAC 8. The control of the MUX 5 output is by a gated, dithered clock signal produced by a gate 4 (described in further detail below). This control input to the MUX 5 is referred herein as a MUX control. For instance, a low state of the MUX control may select the output 13c. A high state of the MUX control may select the output 14c. The function of MUX 5 is to transition its output from a prior chip sample on the spread IF signal 15 (as contained in output 14c) to a subsequent chip sample on the spread IF signal 15 (as contained in output 13c), at a time determined by the MUX control.

Dither may be introduced as a continuous time dither or a discrete time dither. The discrete time dither is described herein. The discrete time dither implementation preferably uses a digital to analog converter 8 (DAC) of transmitter 100 and an analog to digital converter (ADC) 108 (described below in relation to FIG. 4A) of receiver 200 running at a high clock rate. DAC 8 inputs and outputs data at the high clock rate. Similarly, ADC 108 (described below in relation to FIG. 4A) samples at a high clock rate. However, the output of ADC 108 (described below in relation to FIG. 4A) is latched into the output register at the chaos sample rate. The accuracy of the time in which the output of ADC 108 is latched is based on a high rate clock (not shown).

As noted above, a chaos sample clock (not shown) is provided within transmitter 100. The chaos sample clock (not shown) operates at an integer multiple of the chaos chip rate, but may have a phase offset from the chaos chip sample transitions on the spread IF signal 15.

Figure 3:
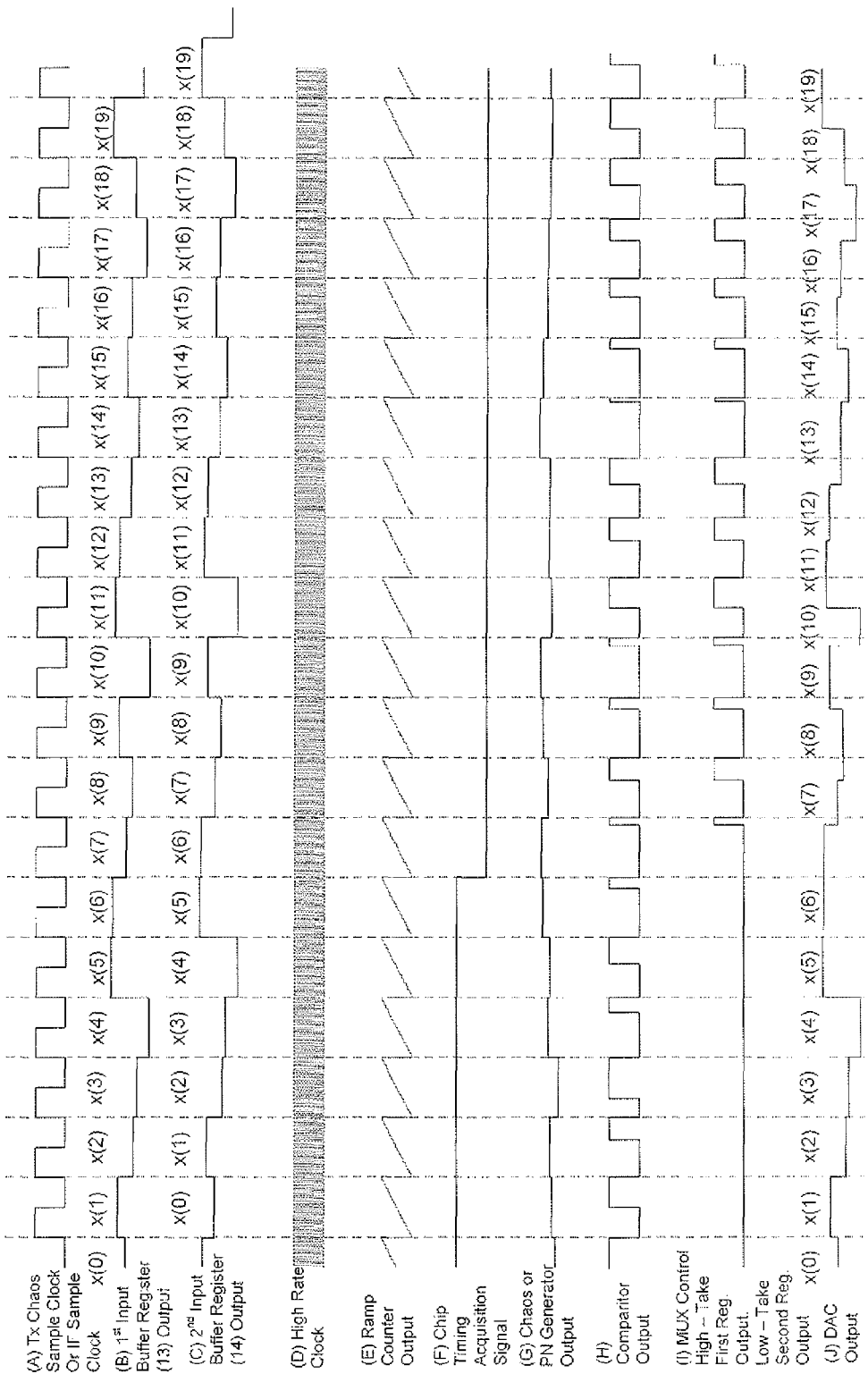
FIG. 3 is a timing diagram of points within the transmitter of FIG. 2.

A high-rate clock 12 is provided, which generally runs at an integer multiple of the chaos sample clock (not shown). For instance, the timing diagrams of FIG. 3 show that the high-rate clock 12 illustrated in waveform (D) runs at sixteen (16) times the rate of the chaos sample clock (not shown) illustrated in waveform (A). Other multiples are possible, with powers of two (2) being easier to generate.

Generator 2 is driven by chaos or a PN function, wherein a chaotic function provides a chaotic sequence of digital values or a PN function provides a pseudorandom sequence of digital values, both within a known, fixed range. Generator 2 is configured to provide a sequence of random numbers. The random numbers of the sequence can be provided per chip sample period. The term "chaos", as used in the context of generator 2, refers to a chaotic process that deterministically generates chaotic samples having various probability distributions.

According to an embodiment of the invention, the sequence of chaotic dithering numbers and the chaotic spreading sequence used to form spread IF signal 15 are generated by the same chaos generator. The invention is not limited in this regard. For example, different chaos generators can be used to generate a second chaotic sequence that is distinct from a first chaotic sequence used to form spread IF signal 15.

A high-rate clock signal 12 is provided as an input to counter 7. Counter 7 is configured to count the number of transitions at its input. Counter 7 is also configured to output a digital word representing a cumulative count of the high-rate clock signal 12. An output of counter 7 (if represented as a discrete-value analog signal) would resemble a stepped ramp voltage, as illustrated by waveform (E) in FIG. 3. Counter 7 is reset once per chaos chip sample period. The digital range provided by counter 7 is at least as large as the digital range provided by chaos or PN generator 2.

Digital comparator 6 has an input 6a, a reference input 6b, and an output 6c. The output of chaos or PN generator 2 is passed to input 6b of digital comparator 6. The output of counter 7 is provided to input 6a to digital comparator 6. The output 6c of digital comparator 6 becomes high (or enabled) when the value of a digital word from counter 7 equals or exceeds the value of the digital word from chaos or PN generator 2. Conversely, output 6c of digital comparator 6 is low (or disabled) when the value of the digital word from counter 7 is less than the value of a digital word from chaos or PN generator 2. Therefore, output 6c of digital comparator 6 forms a discrete time chaos dithered clock having at least one edge each cycle responsive to the value produced by chaos or PN generator 2. The long-term average period of the discrete time chaos dithered clock is substantially the same as the chaos clock period, but individual cycles will vary in duration. Because the discrete time chaos dithered clock is derived from the high-rate clock signal 12, the high-rate clock signal 12 may be referred herein as a primary clock signal.

Furthermore, the high/low state of the discrete time chaos dithered clock (from output 6c) forms a binary state of enablement in the multiplexed selection of samples of the spread IF signal 15.

Gate 4 enables or disables an output signal from digital comparator 6 based on a chip timing acquisition signal 3. Gate 4 is configured to disable the output signal from digital comparator 6 during a chaos chip acquisition period. This output signal disablement provides a stable value at the output of gate 4. The time period during which chaos chip acquisition takes place is referred herein as the chaos chip acquisition time. In effect, the chip timing acquisition signal 3 is a gating signal.

The output of gate 4 is passed to MUX 5. MUX 5 is configured to select between the digital spread IF signal from a first register 13 and a previous sample of the digital spread IF signal available from a second register 14. MUX 5 reads in the gating signal from gate 4 once per period of the high rate clock signal 12. MUX 5 holds the selected input on the output until a time determined by a transition on the gating signal received from gate 4. The selected input is stable only until the next clocking transition of the chaos sample clock signal 1. Upon the next clocking transition the output of the first register 13 is clocked to the output of the second register 14. Concurrently MUX 5 transitions its selected input from the output of the first register 13 to the output of the second register 14. Clock phases are such that race conditions do not occur, thus the output of MUX 5 does not change during this transition period. The output of MUX 5 transitions on the next rising edge of the output of comparator 6. The output value is generally different for the next rising edge transition of comparator 6 that is received from the output of gate 4. The output of MUX 5 is a digital control dither waveform.

DAC 8 is configured to convert the digital value at an input 8a to a voltage value at an output 8c. The conversion takes place at a time determined by a transition of the high-rate clock signal 12 provided at the input 8b of DAC 8. The signal at the output 8c is an analog discrete-value signal. The high rate clock signal 12 is substantially the same at MUX 5, Gate 4, comparator 6, counter 7, and DAC 8, but the edge time of the high rate clock (not shown) may be offset so that the conversion by DAC 8 is performed at a time when the signal at input 8a is relatively stable.

The voltage at the output 8c of DAC 8 is provided as an input to IF-to-RF converter 10. IF-to-RF converter 10 includes an anti-image filter (not shown) to smooth the output of DAC 8 and is configured to translate in frequency the relatively low-frequency spread IF signal 15 up to the relatively high-frequency transmitted RF signal. Systems and methods for performing the functions of IF-to-RF converter 10 are well known to persons having ordinary skill in the art of RF transmitter design. The RF signal outputted from IF-to-RF converter 10 is then provided to antenna 11 for broadcast to receiver 200.

FIG. 3 illustrates the timing of signals at various points within transmitter 100 of communication system 20. It should be noted that the illustration is not to scale unless noted otherwise, and certain features (e.g., timing delay through the DACs and the deviations from nominal sample times) are exaggerated for illustration purposes. Illustration of the waveforms assumes all actions are based on the rising edge of clocks, but the circuit could also be designed to assume actions are based on the falling edge of clocks.

Waveform (A) is an exemplary chaos sample clock used to clock the chaotic chipping samples of the spread IF signal 15 (hereinafter, "IF sample clock"), the IF signal being depicted in FIG. 2. A complete cycle of the IF sample clock is formed by a high and low portion. The IF sample clock has the same period as the chaos sample clock signal 1 and preferably is aligned with the chaos sample clock signal 1.

Waveform (B) represents the data contents of the first input buffer register, i.e., buffer register 13. Each clock cycle time within waveform (B) represents a separate digital buffer value, and blocks within waveform (B) are of substantially equal duration. Transitions to different digital values within waveform (B) occur at points in time marked with dotted lines.

Waveform (C) represents the data contents of the second input buffer register, i.e., buffer register 14. Each clock cycle time within waveform (C) represents a separate digital buffer value. Blocks within waveform (C) are of substantially equal duration. Transitions to different digital values within waveform (C) occur at points in time marked with dotted lines. Like sample identifiers within waveform (B) and waveform (C) illustrate the transfer of buffer register contents with each period of the chaos sample clock in waveform (A). As new data is clocked into the buffer register 13, the previous contents are transferred to the buffer register 14.

Waveform (D) is an exemplary high rate clock 12 (transmit side), or 112 (receive side). Waveform (D) is shown being sixteen (16) times the frequency of waveform (A), but other multiples are possible.

Waveform (E) is an exemplary counter output, i.e., the signal provided by the counter 7 within transmitter 100. The counter increments with each cycle of the high rate clock 12 until it is reset to a count of zero on the onset of a new chaos sample clock cycle by a reset mechanism (not shown). In the embodiment illustrated herein, the counter counts from zero (0) to fifteen (15) and is then reset to 0 at the onset of a new ramp cycle. Each cycle of waveform (E) is substantially of the same duration, and cycles of waveform (E) coincide with cycles of the chaos sample clock 1 in waveform (A).

Waveform (F) in an exemplary of the chip timing acquisition signal 3 of FIG. 2. The chip timing acquisition signal 3 is a logical high voltage during an a priori determined period of time representing the worst case amount of time required for the receiver to synchronize chip and symbol timing. The chip timing acquisition signal 3 then transitions to a logical low voltage and remains in that state during steady state operation. While the chip timing acquisition signal 3 is in a logical high voltage state, gate 4 of FIG. 2 is disabled and MUX 5 selects the same input.

Waveform (G) is an exemplary chaos or PN generator output signal value, i.e., the signal value provided by the generator 2. Although the generator 2 provides digital values in binary form, it will be understood that waveform (E) represents a numeric representation of the binary values provided by the generator 2. Each cycle of waveform (G) is substantially aligned with cycles of the chaos sample clock 1 depicted in waveform (A).

Waveform (H) is an exemplary signal provided at the output of the digital comparator 6. The waveform (H) transitions from a logical low to a logical high at the point in time at which the value of counter 7 shown in waveform (E) equals or exceeds the digital value of the output of the generator 2 shown in waveform (G). Waveform (H) remains high until the start of the next chaos sample clock period.

Waveform (I) is an exemplary signal provided at the output of the gate 4, which is provided as a MUX control to the MUX 5. The waveform (I) transitions from low to high at the point in time at which the value of counter 7 shown in waveform (E) equals or exceeds the digital value of the output of the generator 2 shown in waveform (G) and waveform (F) is in a logical low state. Waveform (I) remains high until the start of the next chaos sample clock period.

Waveform (J) is an exemplary representation of the analog signal provided at the output of the DAC 8, incorporating the discrete-time dithering. Sample identifiers on waveform (J) is coordinated with the sample identifiers of waveforms (B) and (C), with identical sample numbers illustrating corresponding data contents. Waveform (J) takes on the digital value of either buffer register 13 (waveform (B)) or buffer register 14 (waveform (C)), depending upon the state of the MUX 5 control signal (waveform (H)). Dithering is shown in waveform (J) by the different points in time within a chaos sample clock period, from one chaos clock period to another, that the contents of the DAC 8 output in waveform (J) changes, and the resulting unequal durations of each datum within waveform (J).

The dotted vertical lines of FIG. 3 show the nominal chaos output sample times. This illustrates the points in time at which the edges of the output from DAC 5 would take place without the discrete time chaos dithering on the transmitted signal.

Figure 4A:
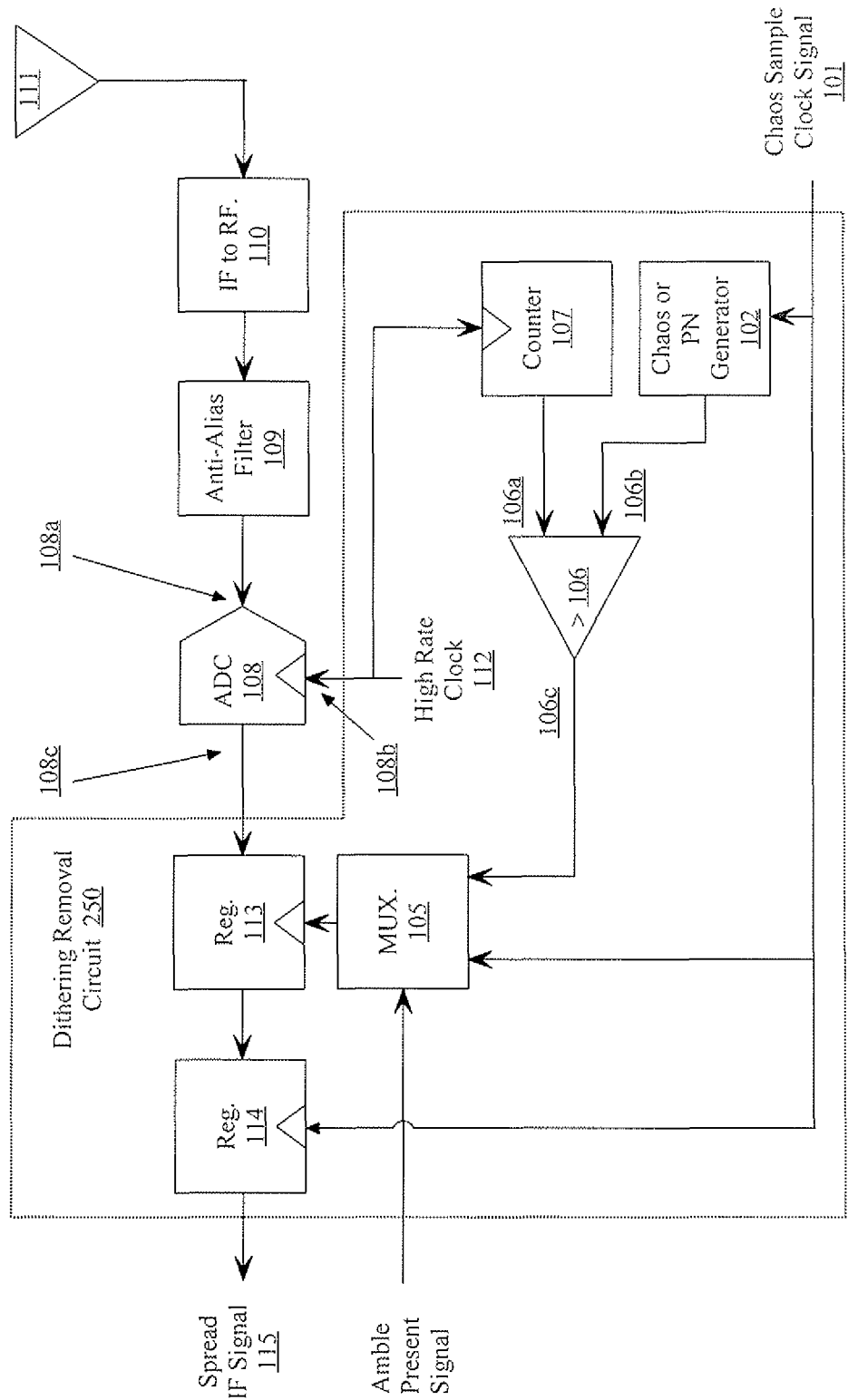
FIG. 4A is a block diagram of a receiver containing a dithering removal circuit according to an embodiment of the invention.

Referring now to FIG. 4A, there is provided a block diagram of receiver 200 of communication system 20 (described above in relation to FIG. 1). Receiver 200 illustrates the removal of dither from the receive side, and recovery of the transmitted signal. As such, receiver 200 comprises a dithering removal circuit 250, an analog to digital converter (ADC) 108, an anti-alias filter 109, an IF-to-RF converter 110, and an antenna 111. Dithering removal circuit 250 is designed to sample a received dithered RF chaotic signal at the same intervals that transmitter 100 converted it to a dithered signal, and then to present the received signal as a uniformly sampled signal. As such, dithering removal circuit 250 comprises a chaos or pseudo-number generator 102, a MUX 105, a digital comparator 106, a counter 107, and buffer register 113, 114.

In order to synchronize transmitter 100 and receiver 200, all time dithering is turned off during a preamble or periodic amble times synchronized with the transmitter, and timing synchronization is achieved using standard synchronization techniques. After a period of time known a priori, after which timing synchronization between transmitter 100 and receiver 200 is attained with a high probability, the transmitter 100 and receiver 200 start their identical dithering circuits in the same state. These processes are referred to generally as timing acquisition and code state acquisition, and the time to perform it is referred to generally as the acquisition time. The dither sequence state can be acquired by synchronizing it to the state of the spreading sequence and thus dither code state acquisition is de facto achieved during timing acquisition and code state acquisition time. Apparatus and methods for performing this synchronization are well known to persons having ordinary skill in the art.

Antenna 111 is configured to receive the dithered RF chaotic signal. The output of antenna 111 is provided to an input of RF-to-IF converter 110. RF-to-IF converter 110 is configured to translate in frequency the relatively high-frequency RF signal down to the relatively low-frequency IF signal. The IF signal is near baseband, and need not be at the same IF frequency as that of the IF signal in transmitter 100. Apparatus and method for performing the function of RF-to-IF converter 110 are well known to persons having ordinary skill in the art of RF receiver design.

Anti-alias filter 109 is configured to limit the frequency of the IF signal inputted to the ADC 108 to the Nyquist frequency of the Spread IF Signal 115. Apparatus and method for performing the function of anti-alias filter 109 are well known to persons having ordinary skill in the art of data conversion design.

A chaos sample clock (not shown) is provided within receiver 200. Chaos clock (not shown) operates at the chaos chip sample rate. Chaos sample clock (not shown) is configured to generate a chaos sample clock signal 101. Generator 102 is driven by chaos or a PN function, wherein the chaos function provides a noise like digital values with a specific and a priori defined distribution and the PN function provides a pseudorandom digital value, both within a known, fixed range. Generator 102 is configured to provide a sequence of said digital values. The samples appear to be random or pseudo-random, yet the generators in the transmitter 100 and receiver 200 are able to synchronize because the samples are based on a highly deterministic process. In one embodiment, the noise sequence is derived from the same generator that is used to remove the chaotic spreading sequence from the spread IF signal. In an alternate embodiment, a different chaos generator is used to derive a second chaotic sequence that is distinct from a first chaotic sequence used to de-spread the received IF signal. In either embodiment, the generators 2, 102 are synchronized to use the same sequence of digital values for the introduction and removal of discrete time chaos dither, respectively. The generators 2, 102 are configured to synchronize the time at which dither is applied and removed.

The IF signal outputted from anti-alias filter 109 is provided at an input 108a of the analog to digital converter ("ADC") 108. ADC 108 is configured to convert an analog voltage value to a digital value at an output 108c, at a time determined by a transition of the high rate clock 112 provided at an input 108b of ADC 108. The digital value at the output 108c is then provided to buffer register 113. Buffer register 113 is clocked by an output of MUX 105, described in further detail below, and the digital value output from buffer register 113 is then input to buffer register 114. Buffer register 114 is clocked at the chaos sample rate to provide a equal duration sampled at the chaos sample rate at its output. The output of buffer register 114 is provided to the remainder to the demodulation functions of receiver 200 as the spread IF signal 115, for subsequent processing including removal of the chaos chip sequence and demodulation of the information symbols. The rate of the chaos sample clock signal 101 is an integer multiple of the chaos chip rate.

The synchronization of generators 2, 102 may be achieved, in one embodiment, in a full duplex system by a handshaking protocol that is used to activate the discrete time chaos dither in both the transmitter 100 and receiver 200. In another embodiment, which is half duplex and no handshaking is possible, transmitter 100 may assume that receiver 200 will acquire timing lock of the chip spreading sequence after some a priori known number of preamble symbol times, during which the dither is inhibited. Furthermore, the communication system 20 may assume a preamble is used. After enough of the preamble has transmitted in order to meet the worst case acquisition time of the receiver 200, overhead symbols can be transmitted to inform the receiver 200 of the time at which the transmitter 100 will start using dither. Overhead symbols may be time-division multiplexed with the data symbols, but other arrangements may also be possible. The message in the header could inform the receiver 200 to turn on the dither immediately, or to turn it on at a predetermined time and for a predetermined duration, etc.

In one embodiment, the digital value from the generator 102 has a uniform probability density within the known, fixed range. However, other probability distributions may be used. The MUX 105 enables or disables the signal derived from the comparator 106 depending upon the state of an Amble Present Signal 103. The MUX 105 selects either the chaos clock 101 or the dithered clock from the comparator 106 for clocking the buffer register 114 when the Amble Present Signal 103 is enabled. The Amble Present Signal 103 may be synchronized with the Chip Timing Acquisition Signal 3 using the methods presented above. The chaos sample clock 101 will be selected for the output of MUX 105 when code acquisition is taking place.

The high-rate clock 112 is provided at the input to the counter 107. The counter 107 produces an increasing digital value having a period equal to the chaos chip period. The digital value range provided by the counter 107 is at least as large as the voltage range provided by the generator 102.

The output of the generator 102 is provided to an input 106b of a digital comparator 106. The output of the counter 107 is provided to an input 106a of the digital comparator 106. An output 106c of the digital comparator 106 will be a logical high voltage when the value of the counter 107 at the input 106a equals or exceeds the value of the generator 102 at the input 106b. The digital comparator 106 functions to convert the variable digital value provided by the generator 102 to a signal at the output 106c having leading edge timing that is variable with respect to the chaos sample clock 101 (similar to the function of the comparator 6). The trailing edge time of the signal at the output 106c is determined by the reset to zero (0) transition of the counter at input 106a. The counter reset control (not shown) is synchronous with the chaos sample clock 101. The signal at the output 106c therefore has an average period substantially the same as the chaos chip sample rate, but the length of time of individual periods of the signal at the output 106c will vary depending on the times of signal edges produced by the comparator 106.

The effect of the dither is to introduce a random or pseudo-random jitter on the timing of each chaos chip. This imparts phase noise onto the RF spectrum, as seen by a receiver that does not know the sequence produced by the generator 2 and therefore cannot remove the dither. The phase noise acts to further disperse the energy density to frequencies offset from the center frequency of the channel encoded signal. The analysis and effect of phase noise upon RF signals is well known to persons skilled in the art.

In steady state conditions, after the chip acquisition time and after the dither acquisition time, the generator 102 is synchronized with the generator 2 in transmitter 100, therefore the receiver 200 is able to remove the effect of dither. However, an unintended receiver generally will not know the chaos chip sequence and/or the dither sequence, and therefore the unintended receiver receives a chaos-chip spread RF signal having a large amount of phase noise. If the unintended receiver knows the chaos chip sequence but not the dither sequence, the unintended receiver will still experience a high level of phase noise, making it difficult to demodulate the information symbols at an acceptable bit error rate.

Figure 4B:
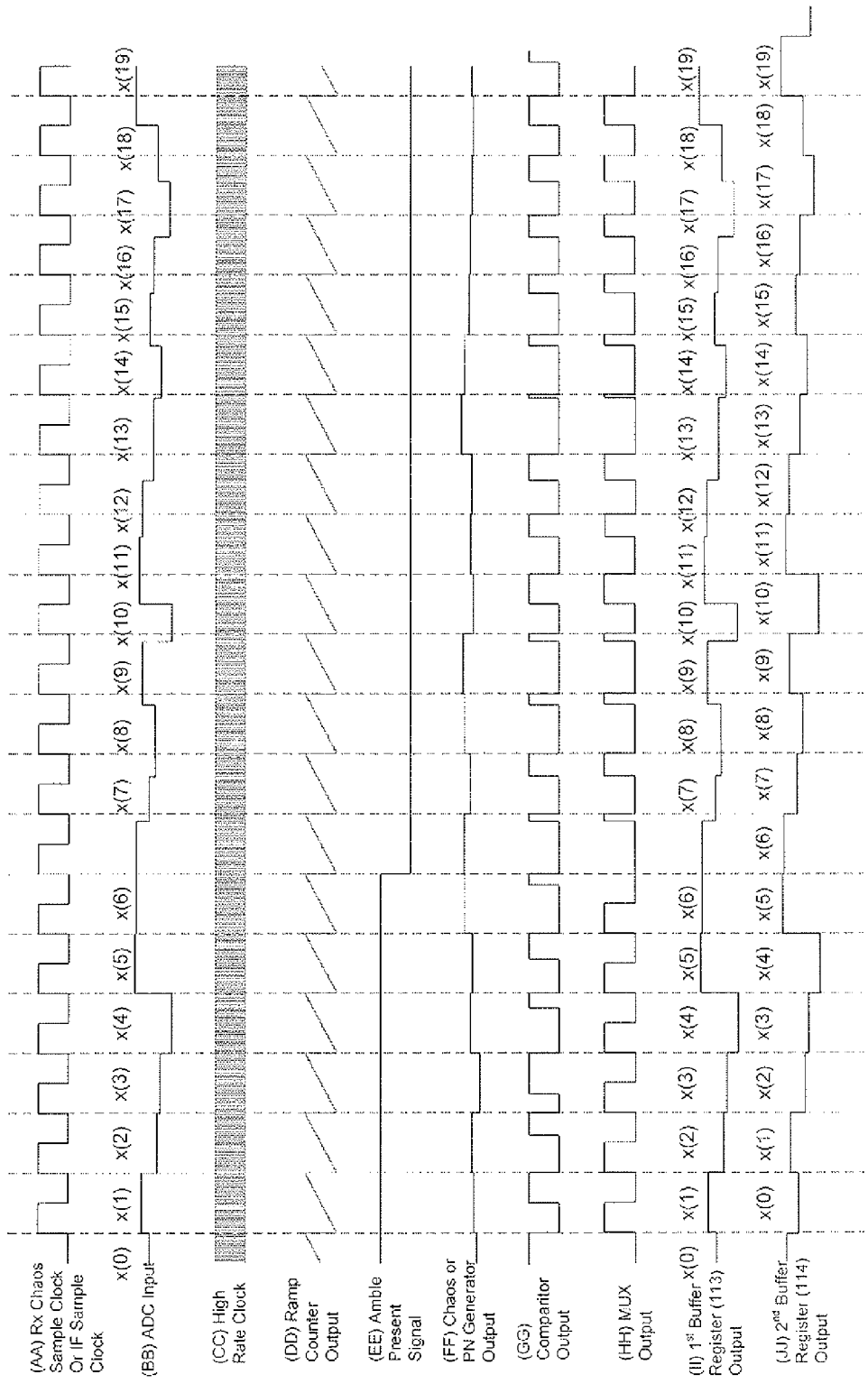
FIG. 4B is a timing diagram of points within the receiver of FIG. 4A.

FIG. 4B illustrates the timing of signals at various points within receiver 200 of communication system 20. It should be noted that the illustration is not to scale unless noted otherwise, and certain features (e.g., timing delay through the ADC 108 and the deviations from nominal sample times) are exaggerated for illustration purposes. Illustration of the waveforms assumes all actions are based on the rising edge of clocks, but the circuit could also be designed to assume actions are based on the falling edge of clocks.

Waveform (AA) is an exemplary chaos sample clock used to clock the chaotic chipping samples of the spread IF signal 115 (hereinafter, "IF sample clock"), the IF signal being depicted in FIG. 4A. A complete cycle of the IF sample clock is formed by a high and low portion. The IF sample clock has the same period as the chaos sample clock signal 101 and preferably is aligned with the chaos sample clock signal 101.

Waveform (BB) represents the analog waveform input to the ADC 108. The waveform is converted to digital format on each rising edge of the high rate clock.

Waveform (CC) is an exemplary high rate clock 12 (transmit side), or 112 (receive side). Waveform (CC) is shown being sixteen (16) times the frequency of waveform (AA), but other multiples are possible.

Waveform (DD) is an exemplary counter output, i.e., the signal provided by the counter 107 within receiver 200. The counter increments with each cycle of the high rate clock 112 until it is reset to a count of zero on the onset of a new chaos sample clock cycle by a reset mechanism (not shown). In the embodiment illustrated herein, the counter counts from zero (0) to fifteen (15) and is then reset to 0 at the onset of a new ramp cycle. Each cycle of waveform (DD) is substantially of the same duration, and cycles of waveform (DD) coincide with cycles of the chaos sample clock 101 in waveform (AA).

Waveform (EE) in an exemplary of the amble present signal 103 of FIG. 4A. The amble present signal 103 is a logical high voltage during an a priori determined period of time representing the worst case amount of time required for the receiver to synchronize chip and symbol timing. The amble present signal 103 then transitions to a logical low voltage and remains in that state during steady state operation. While the chip amble present signal 103 is in a logical high voltage state, MUX 105 of FIG. 4A selects chaos sample clock 101 as the input to be routed to its output. While the chip amble present signal 103 is in a logical low voltage state, MUX 105 of FIG. 4A selects the output of comparator 106, 106c as the input to be routed to its output.

Waveform (FF) is an exemplary chaos or PN generator output signal value, i.e., the signal value provided by the generator 102. Although the generator 102 provides digital values in binary form, it will be understood that waveform (FF) represents a numeric representation of the binary values provided by the generator 102. Each cycle of waveform (FF) is substantially aligned with cycles of the chaos sample clock 101 depicted in waveform (AA).

Waveform (GG) is an exemplary signal provided at the output of the digital comparator 106. The waveform (GG) transitions from a logical low to a logical high at the point in time at which the value of counter 107 shown in waveform (DD) equals or exceeds the digital value of the output of the generator 102 shown in waveform (FF). Waveform (GG) remains high until the start of the next chaos sample clock period when the counter is reset.

Waveform (HH) is an exemplary signal provided at the output of the MUX 105, which is provided as the clock input to the register 113. The waveform (HH) is substantially the same as chaos sample clock signal 101 when the amble present signal is a logical high voltage shown in waveform (EE). The waveform (HH) is substantially the same as the output of comparator 106, signal 106c, when the amble present signal is a logical low voltage shown in waveform (EE).

Waveform (II) is an exemplary representation of the digital signal provided at the output of the buffer register 113, still incorporating the discrete-time dithering on high rate clock increments. Sample identifiers on waveform (II) is coordinated with the sample identifiers of waveforms (BB) and (JJ), with identical sample numbers illustrating corresponding data contents. Waveform (JJ) is the output of buffer register 114, with the dither removed. Dither is removed by buffer register 114 registering the output of buffer resister 113 at chaos sample clock intervals and at an appropriate clock phase.

The dotted vertical lines of FIG. 4B show the nominal chaos output sample times. This illustrates the points in time at which the edges of the output from buffer register 113 would take place without the discrete time chaos dithering on the received signal.

Figure 5:
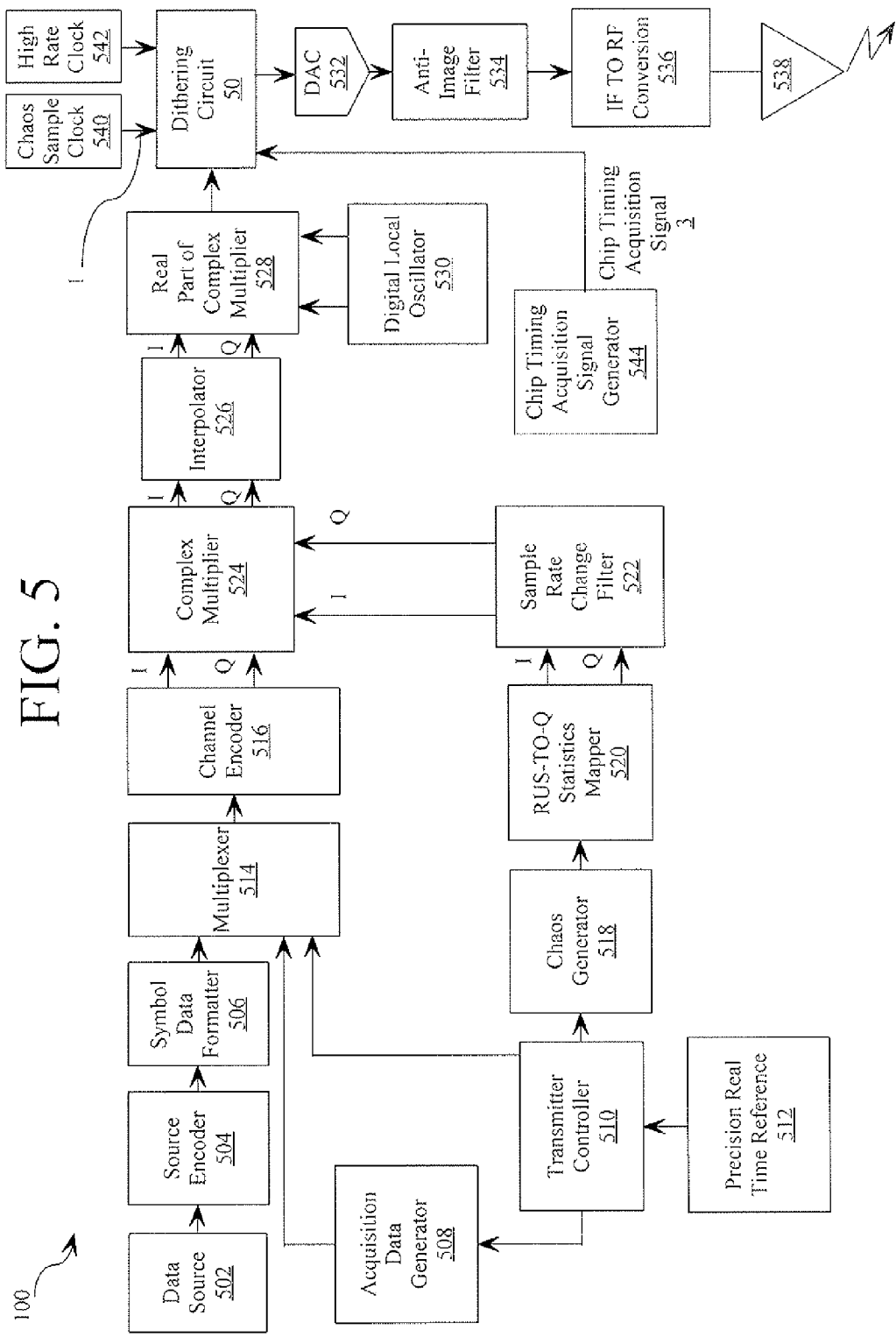
FIG. 5 is a more detailed block diagram of the transmitter of FIGS. 1-2.

Referring now to FIG. 5, there is provided a more detailed block diagram of transmitter 100 that is useful for understanding the invention. It should be noted that the embodiment of FIG. 5 assumes that: (1) a low order phase shift keying (PSK) data modulation is used; (2) no pulse shaping is applied to data symbols; (3) channel encoded data symbols are generated in quadrature form; and (4) chaotic spectral spreading is performed at an intermediate frequency (IF).

Referring again to FIG. 5, transmitter 100 is comprised of a data source 502. Transmitter 100 is also comprised of a source encoder 504, a symbol data formatter 506, an acquisition data generator 508, a transmitter controller 510, a multiplexer 514, a channel encoder 516, a precision real time reference 512, and a digital complex multiplier 524. The transmitter 100 is further comprised of a chaos generator 518, a real uniform statistics to quadrature Gaussian statistics mapper device (RUQG) 520, and a sample rate change filter (SRCF) 522. transmitter 100 is further comprised of an interpolator 526, a digital local oscillator (LO) 530, a real part of a complex multiplier (RPCM) 528, a dithering circuit 50, a chaos sample clock 540, a high rate clock 542, a chip timing acquisition signal generator 544, a digital-to-analog converter (DAC) 532, an anti-image filter 534, an intermediate frequency (IF) to radio frequency (RF) conversion device 536, and an antenna element 538. Each of the above listed components 502-516, 520-538 are well known to persons having ordinary skill in the art. Thus, these components will not be described in detail herein. However, a brief discussion of the transmitter 100 architecture is provided to assist a reader in understanding the present invention.

Referring again to FIG. 5, data source 502 is configured to receive bits of data from an external data source (not shown) as bits of data. In this regard, it should be appreciated that data source 502 is an interface configured for receiving an input signal containing data from an external device (not shown). Data source 502 is further configured to supply bits of data to source encoder 504 at a particular data transfer rate. Source encoder 504 can be configured to encode the data received from the external device (not shown) using a forward error correction coding scheme. The bits of data received at or generated by source encoder 504 represent any type of information that may be of interest to a user. For example, the data can be used to represent text, telemetry, audio, or video data. Source encoder 504 is further configured to supply bits of data to symbol data formatter 506 at a particular data transfer rate.

Symbol data formatter 506 is configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then symbol data formatter 506 can also be configured to differentially encode formed PSK symbol data words. Differential encoding is well known to persons having ordinary skill in the art, and therefore will not be described herein. Symbol data formatter 506 can be further configured to communicate non-differentially encoded PSK symbol data words and/or differentially encoded PSK symbol data words to multiplexer 514. Still, the invention is not limited in this regard.

According to an embodiment of the invention, symbol data formatter 506 is functionally similar to a serial in/parallel out shift register where the number of parallel bits out is equal to log base two ($\log_2$) of the order of channel encoder 516. In this regard, symbol data formatter 506 is selected for use with a quadrature phase shift keying (QPSK) channel encoder. As such, symbol data formatter 506 is configured to perform a QPSK data word formatting function for grouping two (2) bits of data together to form a QPSK symbol data word (i.e., a single two bit parallel word). Thereafter, symbol data formatter 506 communicates the encoded QPSK symbol data word to multiplexer 514. Still, the invention is not limited in this regard.

According to another embodiment of the invention, symbol data formatter 506 is functionally similar to a serial in/parallel out shift register where the number of parallel bits out is equal to log base two ($\log_2$) of the order of channel encoder 516. In this regard, symbol data formatter 506 is selected for use with a binary phase shift keying (BPSK) modulator. As such, symbol data formatter 506 is configured to map one bit of data to a BPSK symbol data word. Thereafter, symbol data formatter 506 communicates the BPSK symbol data word to multiplexer 514. Still, the invention is not limited in this regard.

According to another embodiment of the invention, symbol data formatter 506 is selected for use with a sixteen quadrature amplitude modulation (16QAM) modulator. As such, symbol data formatter 506 is configured to map four (4) bits to a 16QAM symbol data word. Thereafter, symbol data formatter 506 communicates the 16QAM symbol data word to multiplexer 514. Still, the invention is not limited in this regard.

According to another embodiment of the invention, symbol data formatter 506 is selected for use with a binary amplitude shift keying (ASK) modulator. As such, symbol data formatter 506 is configured to map one bit of data to a ASK symbol data word. Thereafter, symbol data formatter 506 communicates the ASK symbol data word to multiplexer 514. Still, the invention is not limited in this regard.

Transmitter 100 also includes an acquisition data generator 508 capable of generating a "known data preamble" that can be used to enable initial synchronization of a chaotic sequence generated in transmitter 100 and receiver 200. The duration of this "known data preamble" is determined by an amount required by receiver 200 to synchronize with transmitter 100 under known worst case channel conditions. In some embodiments of the invention, the "known data preamble" is a repetition of the same known symbol. In other embodiments of the invention, the "known data preamble" is a series of known symbols. Acquisition data generator 508 can be further configured to communicate the "known data preamble" to multiplexer 514.

Referring again to FIG. 5, multiplexer 514 is configured to receive the binary word to be modulated by channel encoder 516 from symbol data formatter 506. Multiplexer 514 is also configured to receive a "known data preamble" from acquisition data generator 508. Multiplexer 514 is coupled to transmitter controller 510. Transmitter controller 510 is configured to control multiplexer 514 so that multiplexer 514 routes the "known data preamble" to channel encoder 516 at the time of a new transmission.

According to an alternative embodiment of the invention, the "known data preamble" is stored in a modulated form. In such a scenario, the architecture of FIG. 5 is modified such that multiplexer 514 exists after channel encoder 516. Still, the invention is not limited in this regard.

According to another embodiment of the invention, the "known data preamble" may be injected at known intervals as a "known data amble" to aid in periodic resynchronization of the chaotic sequence generated in transmitter 100 and receiver 200. This would typically be the case for an implementation meant to operate in harsh channel conditions. Still, the invention is not limited in this regard.

Referring again to FIG. 5, multiplexer 514 is configured to select the symbol data to be routed to channel encoder 516 after a preamble period has expired. Multiplexer 514 is also configured to communicate the symbol data to channel encoder 516. In this regard, it should be appreciated that a communication of the symbol data to channel encoder 516 is delayed by a time defined by the length of the "known data preamble." As should be appreciated, this delay allows all of a "known data preamble" to be fully communicated to channel encoder 516 prior to communication of the symbol data.

Referring again to FIG. 5, channel encoder 516 is configured to perform actions for representing the "known data preamble" and the symbol data in the form of a channel encoded amplitude-and-time-discrete digital signal. The channel encoded amplitude-and-time-discrete digital signal is defined by digital words which represent intermediate frequency (IF) channel encoded symbols comprised of bits of data having a one (1) value or a zero (0) value. Methods for representing digital symbols by an amplitude-and-time-discrete digital signal are well known to persons having ordinary skill in the art. Thus, such methods will not be described in detail herein. However, it should be appreciated that channel encoder 516 can employ any such method. For example, channel encoder 516 can be selected as a digital baseband modulator employing quadrature phase shift keying (QPSK). As will be appreciated by those having ordinary skill in the art, the output of the QPSK channel encoder will include an in-phase ("I") data and quadrature phase ("Q") data. The I and Q data will be thereafter communicated to digital complex multiplier 524.

According to an embodiment of the invention, transmitter 100 is further comprised of a sample rate matching device (not shown) between channel encoder 516 and the digital complex multiplier 524. The sample rate matching device (not shown) is provided for resampling the amplitude-and-time-discrete digital signal at a sampling rate compatible with the chaos sampling rate. As should be appreciated, the sample rate matching device (not shown) modifies the amplitude-and-time-discrete digital signal so that a sample rate of the amplitude-and-time-discrete digital signal is consistent with a digital chaotic sequence communicated to complex multiplier 524. Still, the invention is not limited in this regard.

Referring again to FIG. 5, complex multiplier 524 performs a complex multiplication in the digital domain. In complex multiplier 524, the amplitude-and-time-discrete digital signal from channel encoder 516 is multiplied by a digital representation of a chaotic sequence. The chaotic sequence is generated in chaos generator 518. The rate at which the digital chaotic sequence is generated is an integer multiple of a data symbol rate. The greater the ratio between the data symbol period and the sample period of the digital chaotic sequence, the higher a spreading gain. Chaos generator 518 communicates the chaotic sequence to RUQG 520. RUQG 520 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, RUQG 520 may take in two (2) uniformly distributed real inputs from chaos generator 518 and convert those via a complex-valued bivariate Box-Muller transformation to a quadrature output having statistical characteristics of a Guassian distribution. Such conversions are well understood by those having ordinary skill in the art, and therefore will not be described herein. However, it should be understood that such techniques may use nonlinear processors, look-up tables, iterative processing (CORDIC functions), or other similar mathematical processes. RUQG 520 is further configured to communicate transformed chaotic sequences to SRCF 522.

The statistically transformed output of the digital chaotic sequence has a multi-bit resolution consistent with a resolution of DAC 532. RUQG 520 communicates the statistically transformed output of the digital chaotic sequence to SRCF 522. For example, RUQG 520 communicates an in-phase ("I") data and quadrature phase ("Q") data to SRCF 522 when channel encoder 516 is configured to yield a complex output representation. Still, the invention is not limited in this regard.

If a chaos sample rate of the transformed chaotic sequence is different than a sample rate required by subsequent signal processing, then the two rates must be matched. The chaotic sequence can therefore be resampled in SRCF 522. For example, SRCF 522 can be comprised of a real interpolation filters to upsample each of the in-phase and quadrature-phase processing paths of the chaotic sequence. As should be appreciated, SRCF 522 performs a sample rate change on the transformed digital chaotic sequence so that a sample rate of the transformed digital chaotic sequence is the same as the sampling rates required by subsequent signal processing operations. SRCF 522 is also configured to communicate a resampled, transformed digital chaotic sequence to digital complex multiplier 524.

According to an embodiment of the invention, RUQG 520 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where {u1, u2} are uniformly distributed independent input random variables and {$G_1$, $G_2$} are Gaussian distributed output random variables. In such a scenario, SRCF 522 is comprised of one sample rate change filter to resample an in-phase ("I") data sequence and a second sample rate change filter to resample a quadrature-phase ("Q") data sequence. SRCF 522 is configured to communicate a resampled, transformed digital chaotic sequence to digital complex multiplier 524. More particularly, SRCF 522 communicates an in-phase ("I") data and quadrature phase ("Q") data to digital complex multiplier 524. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. Still, the invention is not limited in this regard.

Digital complex multiplier 524 performs a complex multiplication on the digital chaotic sequence output from SRCF 522 and the amplitude-and-time-discrete digital signal output from channel encoder 516. The resulting output is a digital representation of a coherent chaotic sequence spread spectrum modulated IF signal in which the digital data from channel encoder 516 has been spread over a wide frequency bandwidth in accordance with a chaotic sequence generated by chaos generator 518.

Digital complex multiplier 524 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. Digital complex multiplier 524 is also configured to communicate digital chaotic output signals to interpolator 526.

Interpolator 526, RPCM 528, and quadrature digital local oscillator 530 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those having ordinary skill in the art and shall not be discussed herein.

Interpolator 526 accepts an input from complex multiplier 524. In a preferred embodiment the modulated symbols are in quadrature form and the interpolator is implemented as two real interpolators. Still, the invention is not limited in this regard.

Interpolator 526 raises the sample rate of the amplitude-and-time-discrete digital signal received from complex multiplier 524 to a rate compatible with the bandwidth and center frequency of the second IF. Digital local oscillator 530 generates a complex quadrature amplitude-and-time-discrete digital sinusoid at a frequency which shall translate the first intermediate frequency (IF) to a desired second intermediate frequency (IF). Digital local oscillator 530 is also configured to pass its output to RPCM 528.

RPCM 228 is configured to accept as its inputs the quadrature output of interpolator 526 and the quadrature output of digital local oscillator 530. The real part of a complex multiplication is passed so that RPCM 528 implements only the real output portion of a complex multiplication. RPCM 528 is configured to pass its output to dithering circuit 50 (described above in relation to FIG. 2). Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 5, IF translator (and specifically RPCM 528) is configured to communicate a sampled digital chaotic output signal (i.e., a digital chaotic output signal having an increased sampling rate and a non-zero intermediate frequency) to dithering circuit 50 (described above in relation to FIG. 1). Dithering circuit 50 is configured to receive clock signals from chaos sample clock 540 and high rate clock 542. Dithering circuit 50 is also configured to receive a Chip Timing Acquisition Signal 3 from chip timing acquisition generator 544. Dithering circuit 50 is further configured to generate a discrete-value dither waveform and to communicate the discrete-value dither waveform to DAC 532. DAC 532 is configured to convert the discrete-value dither waveform to an analog signal. DAC 532 is also configured to communicate the analog signal to anti-image filter 534.

In some applications, it can be desirable to change a sampling rate at the output of complex multiplier 524 only (for example when using an integrated interpolating DAC). No IF translator need be provided for this purpose.

Referring again to FIG. 5, anti-image filter 534 is configured to remove spectral images from the analog signal to form a smooth time domain signal. Anti-image filter 534 is also configured to communicate a smooth time domain signal to RF translator 536. RF translator 536 is a wide bandwidth analog IF to RF up converter. RF translator 536 is configured to center a smooth time domain signal at an RF for transmission thereby forming an RF signal. RF translator 536 is also configured to communicate the RF signal to the power amplifier (not shown). The power amplifier (not shown) is configured to amplify a received RF signal. The power amplifier (not shown) is configured to communicate the amplified RF signal to antenna element 538 for communication to receiver 200 (described above in relation to FIGS. 1, 4 and described in further detail below in relation to FIG. 6).

It should be understood that the digital generation of the digital chaotic sequence at transmitter 100 and receiver 200 is kept closely coordinated under the control of a precision real time reference 512 clock. The higher the precision of the clock 512, the closer the synchronization of the chaos generator 518 of transmitter 100 and chaos generator (described below in relation to FIG. 6) of receiver 200 shall be excluding the effects of processing delay differences and channel propagation times. The use of a precision real time reference allows the states of the chaos generators to be easily controlled with precision.

Referring again to FIG. 5, precision real time reference 512 is a stable local oscillator locked to a precision real time reference, such as a GPS clock receiver or a chip scale atomic clock (CSAC). Precision real time reference 512 is configured to supply a high frequency clock to the clocked logic circuits 506 through 532 while being locked to a lower frequency reference clock. The lower frequency reference clock supplies a common reference and a common real time of day reference to prevent a large drift between the states of chaos generator 518 and the chaos generator (described below in relation to FIG. 6) of receiver 200 over an extended time interval.

A person skilled in the art will appreciate that transmitter 100 is one architecture of a communications system transmitter. However, the invention is not limited in this regard and any other transmitter architecture can be used without limitation. For example, transmitter 100 can include real first to second intermediate frequency (IF) translation instead of a quadrature first to second intermediate frequency (IF) translation. As another example, other architectures may employ additional chaotic sequence generators to provide a switched chaotic output or to control other aspects of transmitter 100.

Figure 6:
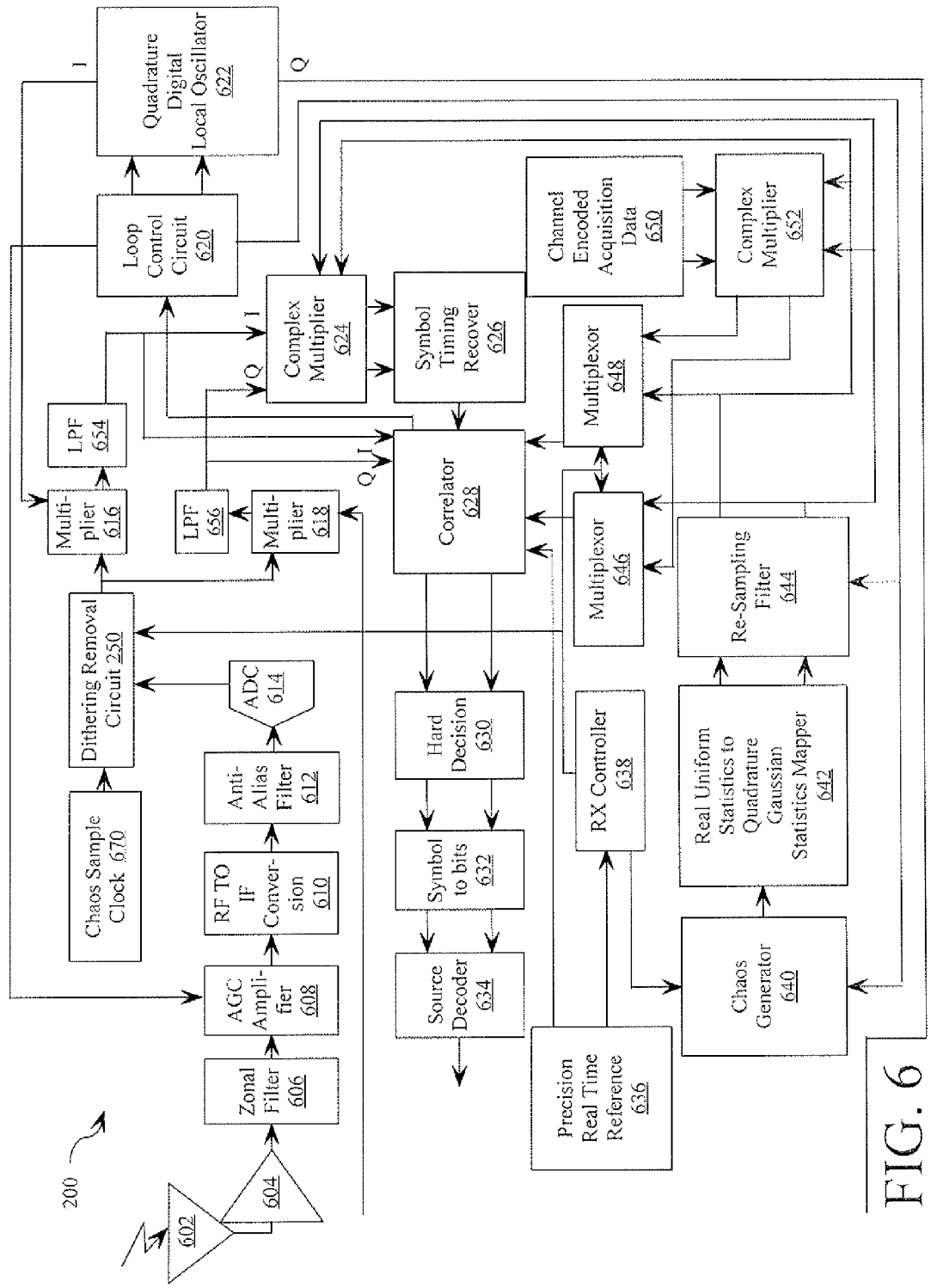
FIG. 6 is a more detailed block diagram of the receiver of FIG. 1 and FIG. 4A.

Referring now to FIG. 6, there is provided a more detailed block diagram of receiver 200 of FIGS. 1 and 4 that is useful for understanding the invention. It should be noted that in conventional analog based coherent communications systems analog chaos circuits are synchronized by periodically exchanging state information. The exchange of state information requires a substantial amount of additional bandwidth. This is what makes analog based coherent communications impracticable. Receiver 200 of FIG. 6 is designed to eliminate the drawbacks of conventional analog based coherent communications systems. In this regard it should be appreciated that receiver 200 is comprised of a digital chaos generator. Receiver 200 includes a tracking loop for synchronizing its digital chaos generator and digital chaos generator 518 of transmitter 100. Most significantly, receiver 200 is configured to synchronize two (2) strings of discrete time chaotic samples (i.e., chaotic sequences) without using a constant or periodic transfer of state update information. A first string of discrete time chaotic samples is generated at transmitter 100. A second string of discrete time chaotic samples is generated at receiver 200.

Referring again to FIG. 6, receiver 200 is comprised of an antenna element 602, a low noise amplifier (LNA) 604, a zonal filter 606, an AGC amplifier 608, a radio frequency (RF) to intermediate frequency (IF) conversion device 610, an anti-alias filter 612, and an analog-to-digital (A/D) converter 614. Receiver 200 is also comprised of a dither removal circuit 250, a chaos sample clock 670, an amble present signal generator (APSG) 672 portion of the Rx controller 638, real multipliers 616, 618, real lowpass filters 654, 656, a loop control circuit 620, a quadrature digital local oscillator (QDLO) 622, a correlator 628, multiplexers 646, 648, a channel encoded acquisition data generator (CEADG) 650, digital complex multipliers 624, 652, and a symbol timing recovery circuit 626. Receiver 200 is further comprised of a receiver controller 638, a precision real time reference clock 636, a hard decision device 630, a symbol to bits (S/B) converter 632, and a source decoder 634. Receiver 200 is comprised of a chaos generator 640, a real uniform statistic to quadrature Gaussian statistic mapper (RUQG) 642, and a re-sampling filter 644. Each of the above listed components and circuits 602-618, 622-626, 630-638, 642-652 are well known to persons having ordinary skill in the art. Thus, these components and circuits will not be described in detail herein. However, a brief discussion of the receiver 200 architecture is provided to assist a reader in understanding the present invention. It should be noted that receiver 200 is utilizing a novel architecture/algorithm when receiver 200 is in both acquisition and tracking modes (described below).

Referring again to FIG. 6, antenna element 602 is configured to receive an analog input signal communicated from transmitter 100 over a communications link. Antenna element 602 is also configured to communicate the analog input signal to LNA 604. LNA 604 is configured to amplify a received analog input signal while adding as little noise and distortion as possible. LNA 604 is also configured to communicate an amplified, analog input signal to zonal filer 606. Zonal filters are analog filters with slow roll off characteristic but low injection loss used to suppress large interfering signals outside of bands of interest. Zonal filters are well known to persons having ordinary skill in the art, and therefore will not be described in detail herein. It should be appreciated that zonal filter 606 is configured to communicate a filtered, analog input signal to the automatic gain control (AGC) amplifier 608. AGC amplifier 608 is a controllable gain amplifier used to keep the magnitude of the received signal within normal bounds for the rest of the signal processing chain. AGC amplifiers are well known to persons having ordinary skill in the art, and therefore will not be described herein. However, it should be appreciated that AGC amplifier 608 is configured to communicate a gain adjusted, analog input signal to the RF to IF conversion device 610.

RF to IF conversion device 610 is configured to mix the analog input signal to a preferred IF for conversion to a digital signal at A/D converter 614. RF to IF conversion device 610 is also configured to communicate a mixed analog input signal to anti-alias filter 612. Anti-alias filter 612 is configured to restrict a bandwidth of a mixed analog input signal. Anti-alias filter 612 is also configured to communicate a filtered, analog input signal to A/D converter 614. A/D converter 614 is configured to convert a received analog input signal to a digital signal. A/D converter 614 is also configured to communicate a digital input signal to dithering removal circuit 250 (described above in relation to FIG. 4A). Dithering removal circuit 250 (described above in relation to FIG. 4A) is configured for receiving a clock signal from chaos sample clock 670 and an Amble Present Signal from signal generator 672 from the Rx controller 638. Dithering removal circuit 250 (described above in relation to FIG. 4A) is also configured for generating a Spread IF Signal 115. Dithering removal circuit 250 (described above in relation to FIG. 4A) is further configured for communicating the Spread IF Signal 115 to a second IF translator. The second IF translator is comprised of real multipliers 616, 618 and QDLO 622. The QFDLO 622, real multipliers 616, 618, and LPFs 654, 656 combine to form a digital Weaver modulator which forms a baseband quadrature signal from the real IF signal generated by the RF front end 602-610.

Multiplier 616 is configured to receive a digital word as input from A/D converter 614 and a digital word from the in-phase component of QDLO 622. Multiplier 616 multiplies the output of A/D converter 614 by the in-phase component of QDLO 622. Multiplier 616 is also configured to communicate a digital output word. Multiplier 618 is configured to receive a digital word as input from A/D converter 614 and a digital word from the quadrature-phase component of QDLO 622. Multiplier 618 multiplies the output of A/D converter 614 by the quadrature-phase component of QDLO 622. Multiplier 618 is also configured to communicate a digital output word.

QDLO 622 generates a complex quadrature amplitude-and-time-discrete digital sinusoid at a frequency which shall translate the first IF to baseband and remove detected frequency and phase offsets in the resulting quadrature baseband signal. QDLO 622 accepts as its inputs a binary phase control word and a binary frequency control word from loop control circuit 620. Quadrature digital local oscillators are known to those having ordinary skill in the art, and therefore will not be described in detail herein.

Lowpass filter 654 receives its input from multiplier 616. Lowpass filter 656 receives its input from multiplier 618. The two lowpass filters collectively reject the undesired sideband from the complex result of the multiplications to form an analytic signal. The outputs of lowpass filters 654, 656 form the output of the IF translator.

The IF translator is configured to mix the digital input signal to a preferred IF for processing at correlator 628 and complex multiplier 624. The IF translator is also configured to communicate a digital input signal to correlator 628 and complex multiplier 624. As will be appreciated by those having ordinary skill in the art, the output of the IF translator can include an in-phase ("I") data and quadrature phase ("Q") data. As such, the IF translator can communicate I and Q data to correlator 628 and complex multiplier 624.

Complex multiplier 624 is configured to perform a complex multiplication in the digital domain. In the complex multiplier 624, the digital input signal from the IF translator is multiplied by a digital representation of a chaotic sequence. The chaotic sequence is generated in chaos generator 640. Chaos generator 640 communicates the chaotic sequence to RUQG 642. In this regard, it should be appreciated that chaos generator 640 is coupled to receiver controller 638. Receiver controller 638 is configured to control chaos generator 640 so that chaos generator 640 generates a chaotic sequence with the correct initial state when receiver 200 is in an acquisition mode and a tracking mode.

RUQG 642 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. RUQG 642 is further configured to communicate transformed chaotic sequences to re-sampling filter 644.

According to the embodiment of the invention, RUQG 642 statistically transforms a digital chaotic sequence into a quadrature Gaussian form of the digital chaotic sequence. RUQG 642 communicates the quadrature Gaussian form of the digital chaotic sequence to re-sampling filter 644. More particularly, RUQG 642 communicates an in-phase ("I") data and quadrature phase ("Q") data to re-sampling filter 644. Still, the invention is not limited in this regard.

Re-sampling filter 644 is also configured to forward a transformed chaotic sequence to digital complex multiplier 624. Re-sampling filter 644 is configured as a sample rate change filter for making the chaos sample rate compatible with the received signal sample rate when receiver 200 is in acquisition mode. Re-sampling filter 644 is also configured to compensate for transmit and receive clock offsets with less than a certain level of distortion when receiver 200 is in a steady state demodulation mode. In this regard, it should be appreciated that re-sampling filter 644 is configured to convert a sampling rate of in-phase ("I") and quadrature-phase ("Q") data sequences from a first sampling rate to a second sampling rate without changing the spectrum of the data contained in therein. Re-sampling filter 644 is further configured to communicate in-phase ("I") and quadrature-phase ("Q") data sequences to complex multipliers 624, 652 and multiplexers 646, 648.

It should be noted that if a sampled form of a chaotic sequence is thought of as discrete samples of a continuous band limited chaos then re-sampling filter 644 is effectively tracking the discrete time samples, computing a continuous representation of the chaotic sequence, and resampling the chaotic sequence at the discrete time points required to match the discrete time points sampled by A/D converter 614. In effect, input values and output values of re-sampling filter 644 are not exactly the same because the values are samples of the same waveform taken at slightly offset times. However, the values are samples of the same waveform so the values have the same power spectral density.

Referring again to FIG. 6, CEADG 650 is configured to generate a modulated acquisition sequence. CEADG 650 is also configured to communicate a modulated acquisition sequence to complex multiplier 652. Complex multiplier 652 is configured to perform a complex multiplication in the digital domain. This complex multiplication includes multiplying a modulated acquisition sequence from CEADG 650 by a digital representation of a chaotic sequence to yield a reference for a digital input signal. Complex multiplier 652 is also configured to communicate reference signal to multiplexers 646, 648. Multiplexer 646 is configured to route the quadrature-phase part of a reference signal to correlator 628. Multiplexer 648 is configured to route the in-phase part of a reference signal to correlator 628. In this regard, it should be appreciated that multiplexers 646, 648 are coupled to receiver controller 638. Receiver controller 638 is configured to control multiplexers 646, 648 in tandem so that the multiplexers 646, 648 route the reference signal to correlator 628 while the receiver 200 is in an acquisition mode (described below).

Correlator 628 is configured to correlate a chaotic sequence with a digital input signal. In this regard, it should be understood that, the sense of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when correlator 628 is in a steady state demodulation mode the output of correlator 628 is PSK symbol soft decisions. In this regard, it should be appreciated that soft information refers to soft-values (which are represented by soft-decision bits) that comprise information about the bits contained in a sequence. In particular, soft-values are values that represent the probability that a particular bit in a sequence is either a one (1) or a zero (0). For example, a soft-value for a particular bit can indicate that a probability of a bit being a one (1) is p(1)=0.3. Conversely, the same bit can have a probability of being a zero (0) which is p(0)=0.7.

Correlator 628 is also configured to communicate PSK soft decisions to hard decision device 630 for final symbol decision making. Hard decision device 630 is configured to communicate symbol decisions to S/B converter 632. S/B converter 632 is configured to convert symbols to a binary form. S/B converter 632 is also configured to communicate a binary data sequence to source decoder 634. Source decoder 634 is configured to decode FEC applied at the transmitter and to pass the decoded bit stream to one or more external devices (not shown) utilizing the decoded data.

Correlator 628 is also configured to acquire initial timing information associated with a chaotic sequence, initial timing associated with a data sequence and to track phase and frequency offset information between the chaotic sequence and a digital input signal. Correlator 628 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to persons skilled in the art, and therefore will not be described in detail herein. However, it should be appreciated that any such method can be used without limitation.

Referring again to FIG. 6, correlator 628 is configured to communicate the magnitude and phase information as a function of time to loop control circuit 620. Loop control circuit 620 uses the magnitude and phase information to calculate the deviation of the input signal magnitude from a nominal range, and phase and frequency offset information to synchronize a chaotic sequence with a digital input signal. Loop control circuit 620 is also configured to communicate the phase and frequency offset information to QDLO 622 portion of the IF translator and gain deviation compensation information to AGC amplifier 608. Loop control circuit 620 is further configured to communicate a retiming control signal to re-sampling filter 644 and chaos generator 640.

It should be understood that the digital generation of the digital chaotic sequence at transmitter 100 and receiver 200 is kept closely coordinated under the control of a precision real time reference clock 636. The higher the precision of the clock 636, the closer the synchronization of chaos generator 518 of transmitter 100 and chaos generator 640 of receiver 200 shall be excluding the effects of processing delay differences and channel propagation times. It is the use of digital chaos generators 518, 640 that allow the states of the chaos generators to be easily controlled with precision, thus allowing coherent communication.

Referring again to FIG. 6, the precision real time reference clock 636 is a stable local oscillator locked to a precision real time reference, such as a GPS clock receiver or a chip scale atomic clock (CSAC). The precision real time reference clock 636 is configured to supply a high frequency clock to the clocked logic circuits 614, . . . , 656 while being locked to a lower frequency reference clock. The lower frequency reference clock supplies a common reference and a common real time of day reference to prevent a large drift between the states of chaos generator 518 and chaos generator 640 of receiver 200 over an extended time interval.

The operation of receiver 200 will now be briefly described with regard to an acquisition mode and a steady state demodulation mode.

Acquisition Mode:

In acquisition mode, re-sampling filter 644 performs a rational rate change and forwards a transformed chaotic sequence to digital complex multiplier 652. CEADG 650 generates a modulated acquisition sequence and forwards the same to complex multiplier 652. Complex multiplier 652 performs a complex multiplication in the digital domain. In complex multiplier 652, a modulated acquisition sequence from CEADG 650 is multiplied by a digital representation of a chaotic sequence to yield a reference for a digital input signal that was generated at transmitter 100 to facilitate initial acquisition. The chaotic sequence is generated in chaos generator 640. Complex multiplier 652 communicates a reference signal to multiplexers 646, 648. Multiplexers 646, 648 route the reference signal to correlator 628. Correlator 628 is transitioned into a search mode. In this search mode, correlator 628 searches across an uncertainty window to locate a received signal state so that chaos generator 640 can be set with the time synchronized state vector.

Steady State Demodulation Mode:

In steady state demodulation mode, correlator 628 tracks the correlation between the received modulated signal and the locally generated chaos close to the nominal correlation peak to generate magnitude and phase information as a function of time. This information is passed to loop control circuit 620. Loop control circuit 620 applies appropriate algorithmic processing to this information to extract timing offset, phase offset, frequency offset, and magnitude compensation information. Correlator 628 also passes its output information, based on correlation times terminated by symbol boundaries, to the hard decision block 630. Hard decision block 630 compares the correlation information to pre-determined thresholds to make hard symbol decisions. Loop control circuit 620 monitors the output of correlator 628. When loop control circuit 620 detects fixed correlation phase offsets, the phase control of QDLO 622 is modified to remove the phase offset. When loop control circuit 620 detects phase offsets that change as a function of time, it adjusts re-sampling filter 644 which acts as an incommensurate re-sampler when receiver 200 is in steady state demodulation mode or the frequency control of QDLO 622 is modified to remove frequency or timing offsets. When the correlator's 628 output indicates that the received digital input signal timing has "drifted" more than plus or minus a half ($\frac{1}{2}$) of a sample time relative to a locally generated chaotic sequence, then loop control circuit 620: (1) adjusts a correlation window in an appropriate temporal direction by one sample time; (2) advances or retards a state of the local chaos generator 640 by one iteration state; and (3) adjusts re-sampling filter 644 to compensate for the time discontinuity. This loop control circuit 620 process keeps chaos generator 518 of transmitter 100 and chaos generator 640 of receiver 200 synchronized to within half ($\frac{1}{2}$) of a sample time.

More precise temporal synchronization is achieved by resampling filter which can be implemented as a member of the class of polyphase fractional time delay filters. This class of filters is well known to persons having ordinary skill in the art, and therefore will not be described herein.

As described above, a number of chaotic samples are combined with an information symbol at transmitter 100. Since transmitter 100 and receiver 200 timing are referenced to two (2) different precision real time reference clock 512, 636 oscillators, symbol timing must be recovered at the receiver 200 to facilitate robust demodulation. Symbol timing recovery can include: (1) multiplying a received input signal by a complex conjugate of a locally generated chaotic sequence using the complex multiplier 624; (2) computing an N point running average of the product where N is a number of chaotic samples per symbol time; (3) storing the values, the maximum absolute values of the running averages, and the time of occurrence; and (4) statistically combining the values at the symbol timing recovery circuit 626 to recover symbol timing. It should be noted that symbol timing recover can also be accomplished via an output of correlator 628. However, additional correlator operations are needed in such a scenario. As should be appreciated, using a separate multiplier operation for this purpose adds additional capabilities to the receiver 200, such as the capability to correlate and post process over multiple correlation windows simultaneously to locate the best statistical fit for symbol timing.

In this steady state demodulation mode, symbol timing recovery circuit 626 communicates a symbol onset timing to correlator 628 for controlling an initiation of a symbol correlation. Correlator 628 correlates a locally generated chaotic sequence with a received digital input signal during a symbol duration. In this regard, it should be understood that the sense and magnitude of a real and imaginary components of the correlation is directly related to the values of the real and imaginary components of symbols of a digital input signal. Accordingly, correlator 628 generates symbol soft decisions. Correlator 628 communicates the symbol soft decisions to hard decision device 630 for final symbol decision making. Hard decision device 630 determines symbols using the symbol soft decisions. Thereafter, hard decision device 630 communicates the symbols to S/B converter 632. S/B converter 632 converts the symbol decisions to a binary form. S/B converter 632 is configured to communicate a binary data sequence to source decoder 634. Source decoder 634 is configured to decide FEC applied at transmitter 100 and pass the decoded bit stream to one or more external devices (not shown) utilizing the decoded data.

A person skilled in the art will appreciate that the receiver 200 is one architecture of a communications system receiver. However, the invention is not limited in this regard and any other receiver architecture can be used without limitation.

Chaos Generators and Digital Chaotic Sequence Generation

Referring now to FIG. 7, there is provided a conceptual diagram of a chaos generator 2, 102, 518, 640 (described above in relation to FIG. 2 and FIGS. 4-6, respectively) that is useful for understanding the invention. As shown in FIG. 7, generation of the chaotic sequence begins with N polynomial equations $f_0(x(nT)), \ldots, f_{N-1}(x(nT))$. The polynomial equations $f_0(x(nT)), \ldots, f_{N-1}(x(nT))$ can be selected as the same polynomial equation or as different polynomial equations. According to an aspect of the invention, the polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (GF). For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT)) \cdot h(x(nT))$.

As will be understood by a person having ordinary skill in the art, each of the polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons having ordinary skill in the art. Thus, such operations will not be described in detail herein. However, it should be appreciated that a RNS residue representation for some weighted value "a" can be defined by mathematical equation (3).

$$R = \{a \text{ modulo } m_0, a \text{ modulo } m_1, \ldots, a \text{ modulo } m_{N-1}\} \quad (3)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{N-1}$ as a moduli $m_0, m_1, \ldots, m_{N-1}$.

Those skilled in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical equation (4).

$$f(x(nT))=Q(k)x^3(nT)+R(k)x^2(nT)+S(k)x(nT)+C(k,L) \quad (4)$$

where n is a sample time index value. k is a polynomial time index value. L is a constant component time index value. T is a fixed constant having a value representing a time interval or increment. Q, R, and S are coefficients that define the polynomial equation $f(x(nT))$. C is a coefficient of $x(nT)$ raised to a zero power and is therefore a constant for each polynomial characteristic. In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation f(x(nT)). Such constant values $C_0, C_1, \ldots, C_{N-1}$ and associated modulus $m_0, m_1, \ldots, m_{N-1}$ values which produce an irreducible form of the stated polynomial equation f(x(nT)) are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 7 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 7, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical equation (5).

$$BL = \text{Ceiling}[\text{Log2}(m)] \quad (5)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3{,}563{,}762{,}191{,}059{,}523$. The binary number system representation of each RNS solution can be computed using Ceiling[Log2(3,563,762,191,059,523)]=Ceiling[51.66]=52 bits. Because each polynomial is irreducible, all 3,563,762,191,059,523 possible values are computed resulting in a sequence repetition time of every M times T seconds, i.e, a sequence repetition times an interval of time between exact replication of a sequence of generated values. Still, the invention is not limited in this regard.

Referring again to FIG. 7, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology,* written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{n_1} = \alpha_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1},$$

$$a_2 = \left\langle \left\lfloor \frac{x}{m_1} \right\rfloor \right\rangle_{m_2},$$

$$a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}.\text{" See Id.}$$

From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. The first known formulation of the Chinese Remainder Theorem is attributed to Sunzi in his "Book of Arithmetics" circa 500 A.D. However, a brief discussion of how the CRT is applied may be helpful for understanding the invention. The CRT arithmetic operation can be defined by a mathematical equation (6) [returning to zero (0) based indexing].

$$Y(nT) = \quad (6)$$

$$\left\{ \begin{array}{l} \left[ \langle (3x_0^3(nT) + 3x_0^2(nT) + x_0(nT) + C_0)b_0 \rangle_{p_0} \right] \frac{M}{p_0} + \ldots + \\ \left[ \langle (3x_{N-1}^3(nT) + 3x_{N-1}^2(nT) + x_{N-1}(nT) + C_{N-1})b_{N-1} \rangle_{p_{N-1}} \right] \frac{M}{p_{N-1}} \end{array} \right\}_M$$

Mathematical Equation (6) can be re-written in iterative form as mathematical Equation (7).

$$Y(nT) = \left\{ \begin{array}{l} \left[ \langle (3x_0^3((n-1)T) + 3x_0^2((n-1)T) + x_0((n-1)T) + C_0)b_0 \rangle_{p_0} \right] \frac{M}{p_0} + \ldots + \\ \left[ \langle (3x_{N-1}^3((n-1)T) + 3x_{N-1}^2((n-1)T) + x_{N-1}((n-1)T) + C_{N-1})b_{N-1} \rangle_{p_{N-1}} \right] \frac{M}{p_{N-1}} \end{array} \right\}_M \quad (7)$$

where Y(nT) is the result of the CRT arithmetic operation. n is a sample time index value. T is a fixed constant having a value representing a time interval or increment. $x_0$–$x_{N-1}$ are RNS solutions Nos. 1 through N. $p_0, p_1, \ldots, p_{N-1}$ are prime numbers. M is a fixed constant defined by a product of the relatively prime numbers $p_0, p_1, \ldots, p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left( \frac{M}{p_j} \right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, the $b_j$'s can be defined as $$b_j = \left( \frac{M}{p_j} \right)^{-1} \bmod p_j.$$

In other embodiments of the present invention, all $b_j$'s can be set equal to one or more non-zero values without loss of the chaotic properties.

As should be appreciated, the chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by a mathematical equation (8).

$$MBL = \text{Ceiling}[\text{Log2}(M)] \quad (8)$$

where M is the product of the relatively prime numbers $p_0, p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into equation (8), the bit length (BL) for a chaotic sequence output Y(nT) expressed in a binary system representation can be calculated as follows:

BL=Ceiling[Log2(3,563,762,191,059,523)]=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, chaotic sequence output Y(nT) can be a binary sequence representing a truncated portion of a value between zero (0) and M−1. In such a scenario, the chaotic sequence output Y can have a bit length less than Ceiling[Log2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (4) can be rewritten in a general iterative form: $f(x(nT)) = Q(k)x^3((n-1)T) + R(k)x^2((n-1)T) + S(k)x((n-1)T) + C(k,L)$. For example, a fixed coefficient polynomial equation is selected as $f(x(n \cdot 1 \text{ ms})) = 3x^3((n-1) \cdot 1 \text{ ms}) + 3x^2((n-1) \cdot 1 \text{ ms}) + x((n-1) \cdot 1 \text{ ms}) + 8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Referring now to FIG. 8, there is provided a flow diagram of a method 800 for generating a chaotic sequence that is useful for understanding the invention. As shown in FIG. 8, method 800 begins with step 802 and continues with step 804. In step 804, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 804, step 806 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 808, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 806. It should also be appreciated that a different modulus must be selected for each polynomial equation $f_0(x(nT)), \ldots, f_{N-1}(x(nT))$.

As shown in FIG. 8, the method 800 continues with a step 810. In step 810, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 806 for generating an irreducible form of the respective polynomial equation $f_0(x(nT)), \ldots, f_{N-1}(x(nT))$.

After step 810, method 800 continues with step 812. In step 812, a value for time increment "T" is selected. Thereafter, step 814 is performed where an initial value for "x" is selected. In this regard, it should be appreciated that the initial value for "x" can be any value allowable in a residue ring. Subsequently, step 816 is performed where RNS arithmetic operations are used to iteratively determine RNS solutions for each of the stated polynomial equations $f_0(x(nT)), \ldots, f_{N-1}(x(nT))$. In step 818, a series of digits in a weighted number system are determined based in the RNS solutions. This step can involve performing a mixed radix arithmetic operation or a CRT arithmetic operation using the RNS solutions to obtain a chaotic sequence output.

After step 818, method 800 continues with a decision step 820. If a chaos generator is not terminated (820:NO), then step 824 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 816. Subsequently, method 800 returns to step 816. If the chaos generator is terminated (820:YES), then step 822 is performed where method 800 ends.

A person skilled in the art will appreciate that method 800 is one example of a method for generating a chaotic sequence. However, the invention is not limited in this regard and any other method for generating a chaotic sequence can be used without limitation.

Referring now to FIG. 9, there is illustrated one embodiment of chaos generator 2. Chaos generator 2 is comprised of hardware and/or software configured to generate a digital chaotic sequence. In this regard, it should be appreciated that chaos generator 2 is comprised of computing processors $902_0$-$902_{N-1}$. Chaos generator 2 is also comprised of a mapping processor 904. Each computing processor $902_0$-$902_{N-1}$ is coupled to mapping processor 904 by a respective data bus $906_0$-$906_{N-1}$. As such, each computing processor $902_0$-$902_{N-1}$ is configured to communicate data to mapping processor 904 via a respective data bus $906_0$-$906_{N-1}$. Mapping processor 904 can be coupled to an external device (not shown) via a data bus 908. In this regard, it should be appreciated that the external device (not shown) includes, but is not limited to, a communications device configured to combine or modify a signal in accordance with a chaotic sequence output.

Referring again to FIG. 9, computing processors $902_0$-$902_{N-1}$ are comprised of hardware and/or software configured to solve N polynomial equations $f_0(x(nT)), \ldots, f_{N-1}(x(nT))$ to obtain a plurality of solutions. The polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $902_0$-$902_{N-1}$ employ modulo operations to calculate a respective solution for each polynomial equation $f_0(x(nT)), \ldots, f_{N-1}(x(nT))$ using modulo based arithmetic operations. Each of the computing processors $902_0$-$902_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $902_0$-$902_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $902_0$-$902_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $910_0$-$910_{N-1}$ are chaotic. In this regard, it should be appreciated that the feedback mechanisms $910_0$-$910_{N-1}$ are provided so that the solutions for each polynomial equation $f_0(x(nT)), \ldots, f_{N-1}(x(nT))$ can be iteratively computed. Accordingly, the feedback mechanisms $910_0$-$910_{N-1}$ are comprised of hardware and/or software configured to selectively define a variable "x" of a polynomial equation as a solution computed in a previous iteration.

Referring again to FIG. 9, computing processors $902_0$-$902_{N-1}$ are further comprised of hardware and/or software configured to express each of the RNS residue values in a binary number system representation. In this regard, the computing processors $902_0$-$902_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, computing processors $902_0$-$902_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, the invention is not limited in this regard.

Referring again to FIG. 9, mapping processor 904 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 904 can be comprised of hardware and/or software configured to determine the series of digits in the weighted number system based on the RNS residue values using a Chinese Remainder Theorem process. In this regard, it will be appreciated by those skilled in the art that the mapping processor 904 is comprised of hardware and/or software configured to identify a number in the weighted number system that is defined by the moduli solutions Nos. 1 through N.

According to an aspect of the invention, the mapping processor 904 can be comprised of hardware and/or software configured to identify a truncated portion of a number in the weighted number system that is defined by the moduli solutions Nos. 1 through N. For example, the mapping processor 904 can also be comprised of hardware and/or software configured to select the truncated portion to include any serially arranged set of digits of the number in the weighted number system. Further, the mapping processor 904 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 9, mapping processor 904 is comprised of hardware and/or software configured to express a chaotic sequence in a binary number system representation. In this regard, it should be appreciated that the mapping processor 904 can employ a weighted-to-binary conversion method. Such methods are generally known to persons skilled in the art and therefore will not be described in great detail herein. However, it should be appreciated that any such method can be used without limitation.

A person skilled in the art will appreciate that chaos generator 2 is one architecture of a chaos generator. However, the invention is not limited in this regard and any other chaos generator architecture can be used without limitation.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for reducing cyclostationary content in a chaotic spread spectrum data communication channel, comprising:
    digitally generating a first transmit-side chaotic sequence of values to form a spreading code;
    using said spreading code to form a digital intermediate frequency (IF) spread spectrum signal having a uniform sampling interval;
    selectively varying a duration of said sampling interval in accordance with a first pseudo-random sequence to introduce a known dither in said digital IF spread spectrum signal;
    subsequent to introducing said known dither, converting said digital IF spread spectrum signal to an analog RF spread spectrum signal at a conversion rate that exceeds said sampling interval.

2. The method according to claim 1, further comprising where said first pseudo-random sequence comprises a second transmit-side chaotic sequence.

3. The method according to claim 1, further comprising:
    receiving said RF spread spectrum signal at a receiver;
    converting said RF spread spectrum signal to a received digital IF spread spectrum signal;
    generating at said receiver a second pseudo-random sequence which is identical to said first pseudo-random sequence; and
    using said second pseudo-random sequence to remove said known dither in said received digital IF spread spectrum signal and thereby generate a uniform received digital IF spread spectrum signal having said uniform sampling interval.

4. The method according to claim 3, further comprising synchronizing said second pseudo-random sequence and said first pseudo-random sequence.

5. The method according to claim 3, further comprising:
    generating at said receiver a de-spreading code which is identical to said spreading code; de-spreading said received digital IF spread spectrum signal using said de-spreading code.

6. The method according to claim 1, wherein said step of selectively varying a duration of said sampling interval further comprises:
    buffering a first sample of the digital IF spread spectrum signal having a first time delay;
    buffering a second sample of the digital IF spread spectrum signal having a second time delay;
    selectively varying a duration of an output sample time of said first sample and said second sample responsive to a dither control signal.

7. The method according to claim 6, further comprising generating said dither control signal responsive to said first pseudo-random sequence.

8. A system for reducing cyclostationarity in a chaotic spread spectrum data communication channel, comprising:
    a first digital generator configured for producing a first transmit-side chaotic sequence of values to form a spreading code;
    a modulator configured for using said spreading code to form a digital intermediate frequency (IF) spread spectrum signal having a uniform sampling interval;
    a timing variation apparatus configured for selectively varying a duration of said sampling interval in accordance with a first pseudo-random sequence to introduce a known dither in said digital IF spread spectrum signal;
    a digital-to-analog converter accepting said digital IF spread spectrum signal incorporating said known dither, and producing an analog IF spread spectrum signal at a conversion rate that exceeds said sampling interval of said digital IF spread spectrum signal.

9. The system according to claim 8, wherein said first pseudo-random sequence comprises a second transmit-side chaotic sequence.

10. The system according to claim 8, further comprising a receiver configured for receiving said RF spread spectrum signal;
    a down-converter configured for converting said RF spread spectrum signal to a received digital IF spread spectrum signal;
    a second digital generator at said receiver configured for digitally generating a second pseudo-random sequence which is identical to said first pseudo-random sequence; and a dither removal circuit configured for using a second pseudo-random sequence to remove said known dither in said received digital IF spread spectrum signal and thereby generate a uniform received digital IF spread spectrum signal having said uniform sampling interval.

11. The system according to claim 10, wherein said receiver further comprises a synchronizer configured for synchronizing said second pseudo-random sequence and said first pseudo-random sequence.

12. The system according to claim 10, wherein said receiver further comprises: a de-spreader configured for using a de-spreading code, which is identical to said spreading code, for de-spreading said received digital IF spread spectrum signal.

13. The system according to claim 8, wherein said timing variation apparatus further comprises:
a first buffer configured for buffering a first sample of the digital IF spread spectrum signal, having a first time delay;
a second buffer configured for buffering a second sample of the digital IF spread spectrum signal, having a second time delay;
a multiplexer coupled to said first buffer and said second buffer configured for selectively varying a duration of an output sample time of said first sample and said second sample responsive to a dither control signal.

14. The system according to claim 13, further comprising a dither control signal generator configured for generating said dither control signal responsive to said first pseudo-random sequence.

15. An apparatus for reducing cyclostationarity in a chaotic spread spectrum data communication channel, comprising:
a first digital generator configured for producing a first chaotic sequence of values to form a spreading code;
a modulator configured for using said spreading code to form a digital intermediate frequency (IF) spread spectrum signal having a uniform sampling interval;
a timing variation apparatus configured for selectively varying a duration of said sampling interval in accordance with a second chaotic sequence to introduce a known dither in said digital IF spread spectrum signal;
a digital-to-analog converter accepting said digital IF spread spectrum signal incorporating said known dither, and producing an analog IF spread spectrum signal at a conversion rate that exceeds said sampling interval of said chaotic spread spectrum signal.

16. A receiver, comprising:
an antenna configured to receive an RF spread spectrum signal having a duration of sampling intervals selectively varied in accordance with a first chaotic sequence to introduce a known dither in said RF spread spectrum signal;
a converter configured to convert said RF spread spectrum signal to a received digital IF spread spectrum signal;
a generator configured to produce a second chaotic sequence which is identical to said first chaotic sequence; and
a dither removal circuit configured to use said second chaotic sequence to remove said known dither in said received digital IF spread spectrum signal, and thereby generate a uniform received digital IF spread spectrum signal having a uniform sampling interval.

17. The receiver according to claim 16, further comprising a de-spreader configured to despread said digital IF spread spectrum signal using a despreading sequence.

18. A receiver for receiving an RF spread spectrum signal, the signal having a duration of sampling intervals selectively varied in accordance with a first pseudo-random sequence to introduce a known dither in said RF spread spectrum signal, comprising:
a converter configured to convert said RF spread spectrum signal to a received digital IF spread spectrum signal;
a generator configured to produce a second pseudo-random sequence which is identical to said first pseudo-random sequence;
a dither removal circuit configured to use said second pseudo-random sequence to remove said known dither in said received digital IF spread spectrum signal and thereby generate a uniform received digital IF spread spectrum signal having a uniform sampling interval;
a de-spreader configured to despread said digital IF spread spectrum signal using a despreading sequence; and
a digital chaos generator configured to generate said despreading sequence.

19. A receiver for receiving an RF spread spectrum signal, the signal having a duration of sampling intervals selectively varied in accordance with a first pseudo-random sequence to introduce a known dither in said RF spread spectrum signal, comprising:
a converter configured to convert said RF spread spectrum signal to a received digital IF spread spectrum signal;
a generator configured to produce a second pseudo-random sequence which is identical to said first pseudo-random sequence; and
a dither removal circuit configured to use said second pseudo-random sequence to remove said known dither in said received digital IF spread spectrum signal and thereby generate a uniform received digital IF spread spectrum signal having a uniform sampling interval;
wherein said first and second pseudo-random number sequences comprise chaotic sequences.

* * * * *